US011960488B2

(12) United States Patent
Seebach et al.

(10) Patent No.: US 11,960,488 B2
(45) Date of Patent: Apr. 16, 2024

(54) JOIN QUERIES IN DATA VIRTUALIZATION-BASED ARCHITECTURE

(71) Applicant: Molecula Corp., Austin, TX (US)

(72) Inventors: Peter Seebach, Northfield, MN (US); Matthew Jaffee, Austin, TX (US); Travis Turner, Austin, TX (US)

(73) Assignee: Molecula Corp., Austin, TX (US)

( * ) Notice: Subject to any disclaimer, the term of this patent is extended or adjusted under 35 U.S.C. 154(b) by 0 days.

(21) Appl. No.: 17/539,128

(22) Filed: Nov. 30, 2021

(65) Prior Publication Data
US 2022/0374424 A1 Nov. 24, 2022

Related U.S. Application Data

(60) Provisional application No. 63/192,431, filed on May 24, 2021.

(51) Int. Cl.
*G06F 16/2455* (2019.01)
*G06F 16/22* (2019.01)
*G06F 16/248* (2019.01)
*G06F 16/25* (2019.01)

(52) U.S. Cl.
CPC ...... *G06F 16/2456* (2019.01); *G06F 16/2282* (2019.01); *G06F 16/248* (2019.01); *G06F 16/256* (2019.01)

(58) Field of Classification Search
None
See application file for complete search history.

(56) References Cited

U.S. PATENT DOCUMENTS

| | | | |
|---|---|---|---|
| 7,577,667 B2* | 8/2009 | Hinshaw | G06F 16/273 |
| 9,916,350 B2 | 3/2018 | Young et al. | |
| 10,002,148 B2 | 6/2018 | Mukherjee et al. | |
| 10,025,822 B2 | 7/2018 | Das et al. | |
| 10,346,404 B2 | 7/2019 | Arndt et al. | |
| 10,956,418 B2 | 3/2021 | Eidson et al. | |
| 10,977,251 B1* | 4/2021 | Gibas | G06F 16/282 |
| 11,263,026 B2* | 3/2022 | Maycotte | G06F 16/90335 |
| 11,687,513 B2* | 6/2023 | Maycotte | G06F 9/543 |
| | | | 707/741 |
| 2018/0181616 A1* | 6/2018 | Patel | G06F 16/2456 |
| 2021/0240708 A1* | 8/2021 | Molinari | G06F 16/2456 |
| 2021/0373916 A1* | 12/2021 | Maycotte | G06F 9/44526 |
| 2021/0374115 A1* | 12/2021 | Maycotte | G06F 16/2237 |
| 2021/0374263 A1* | 12/2021 | Maycotte | G06F 16/2228 |
| 2022/0374404 A1* | 11/2022 | Johnson | G06F 16/2246 |
| 2022/0374424 A1* | 11/2022 | Seebach | G06F 16/256 |

* cited by examiner

*Primary Examiner* — Kim T Nguyen
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to performing a join operation with bitmap indexes of virtual data sources (VDSs). A distributed compute cluster having a set of compute nodes may maintain a plurality of VDSs based on a set of corresponding origins. A given VDS of the plurality of VDSs may include a bitmap index representative of a portion of data stored at the set of origins. The distributed compute cluster may receive a request for data stored across at least first and second bitmap indexes of the plurality of VDSs. The distributed compute cluster may perform a join operation to generate a join result having data from the first and second bitmap indexes. The distributed compute cluster may return a response that includes the join result.

19 Claims, 25 Drawing Sheets

*800*

Creating Virtual Data Source (VDS)
Based on Corresponding Origin
810

*FIG. 8*

JOIN QUERIES IN DATA VIRTUALIZATION-BASED ARCHITECTURE

RELATED APPLICATIONS

This application claims priority to U.S. Provisional Appl. No. 63/192,431 filed on May 24, 2021, which is incorporated by reference herein in its entirety.

BACKGROUND

Technical Field

The present disclosure relates generally to data virtualization and, more specifically, to an architecture for facilitating join queries using virtual data sources derived from underlying data sources.

Description of the Related Art

While there has been a growth in big data in recent years, the promise of improved decision making based on this data has largely been unrealized. By one estimate, business decisions (whether made by humans or machines) are being made based on only one percent of extant data. Many business intelligence projects, big-data driven applications, and artificial intelligence and machine learning initiatives are failing in part due to lack of access to data. It has been estimated that as much as $400+ billion in potential business value is currently locked in so-called "dark" (i.e., inaccessible) data.

Additionally, there is frequently a large amount of copying of data in organizations between an original data repository and the point at which a decision is made. It is estimated that as much as 85% of all data by volume is a copy that results from pre-processing, pre-joining, and aggregating disparate data into data formats and structures that are more performant for analytical purposes than the source systems. For example, original data is often extracted in batch processes, transformed, and copies loaded (ETL) into analytical data lakes, OLAP cubes, and materialized views so that it can be combined and organized to make it more easily analyzable. Additionally, original data is frequently copied across multiple repositories located in different geographic regions to fulfill jurisdictional requirements. Sometimes data is copied from edge locations containing sensors into central locations so that it can be combined with the relevant metadata needed to properly make decisions from the sensor readings. In other cases, this copying process is undertaken to move data closer to users and applications in different geographic regions around the world in order to make it more performant. Copying information from one traditional data repository to another can be very bandwidth intensive and a slow process as the information is usually not formatted (or compressed) in a manner that reduces the size of that information. This copying results not only in increased security risk, but also in a high additional cost in storing multiple copies or data and transporting it across networks.

BRIEF DESCRIPTION OF THE DRAWINGS

FIG. 8 is a flow diagram illustrating an example method relating to creating a VDS, according to some embodiments.

DETAILED DESCRIPTION

Figure 1A:
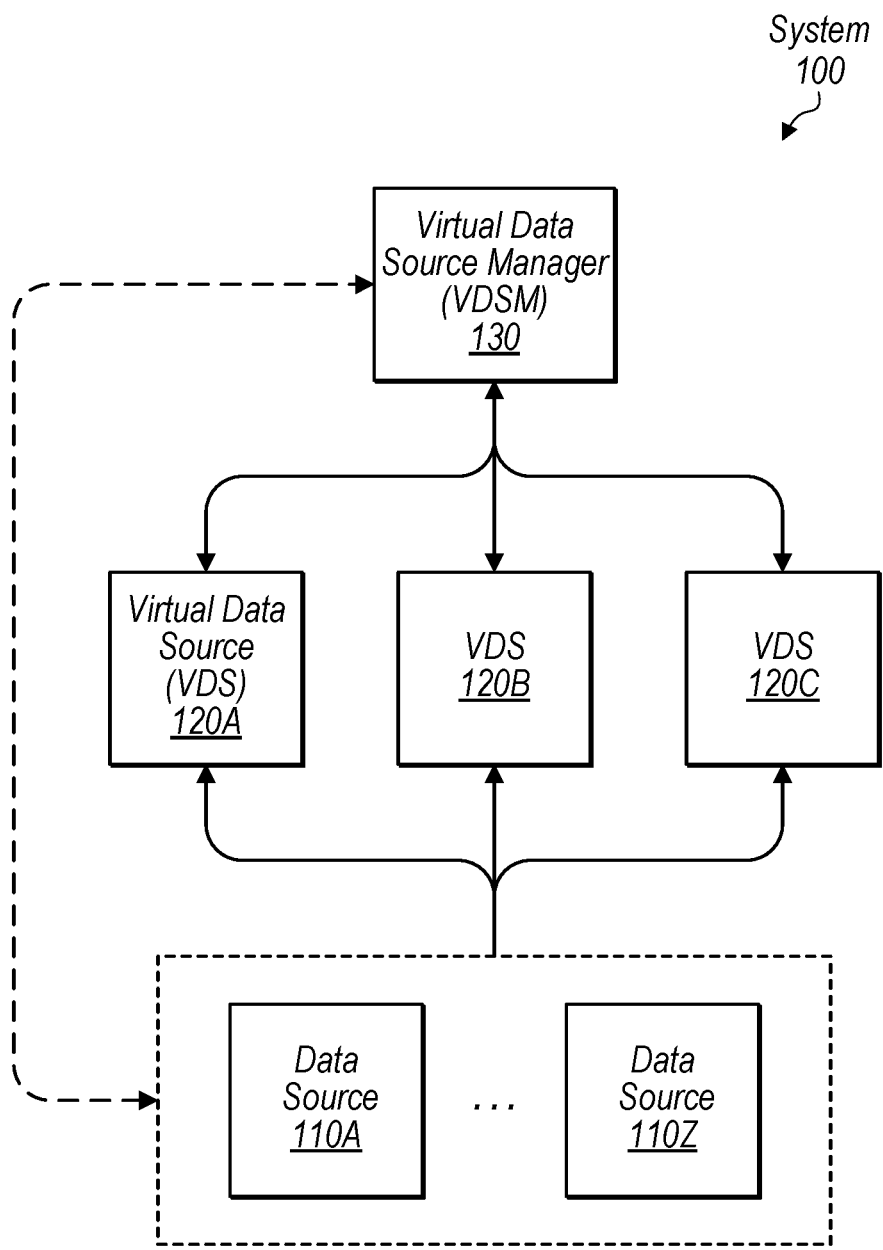
FIG. 1A is a block diagram illustrating example elements of a system that includes a virtual data source manager (VDSM) that is capable of managing virtual data sources (VDSs), according to some embodiments.

One approach for reducing information size and the amount of time needed to process certain requests for information is to store that information in a different format than traditional database tables. Pilosa® includes an open-source project that provides software for storing a data repository using a set of bitmap indexes. Bitmap indexes can be space efficient and allow for quick bitwise operations against the underlying information. As a result, various cases, such as the one posed above, may take milliseconds to implement instead of seconds, minutes, hours, or sometimes days, significantly speeding up the operation of the system. Such systems are described, for example, in U.S. Pat. Nos. 9,280,780; 9,489,410; and 9,607,104.

The present disclosure describes various techniques for implementing an infrastructure that allows data representations such as bitmap indexes to be scaled in order to manage vast amounts of data, as well as to perform a wider variety of functionality. In various embodiments, a system includes a virtual data source manager (VDSM) that manages virtual data sources (VDSs) that include data representations (e.g., bitmap indexes) of data stored in corresponding underlying, or original, data sources. For example, a VDS may include a bitmap index that is representative of data stored in a relational database. The VDS may further directly include or leverage external translation key metadata that allows for the format of the bitmap index to be interpreted so that data can be extracted from the bitmap index.

A VDS may also be thought of in some embodiments as a "feature store" in that it stores "features." In certain fields, including machine learning, a feature is an individual measurable property or characteristic of an entity, object, or phenomenon. A bitmap index is sometimes organized as storing attributes (features) in columns for objects/entities/phenomena that correspond to rows in the index. A feature thus corresponds to a specification of an attribute and its value. A "feature vector" is an ordered set of features for an entity, and a "feature set" is a list of all attributes of interest at a particular time. Raw data that has been collected, organized and curated in this manner for a particular purpose (e.g., business intelligence) can be said to constitute a feature store.

A VDS may be created by a VDSM in response to receiving a request via an application programming interface (API) of the VDSM. In some embodiments, the VDSM provides a user interface that enables a user such as a system administrator to select from various options when creating, copying, importing, or linking a VDS. For example, the user might select an original data source for the VDS from a list of data sources. The user interface may then send a request to create a VDS via the VDSM's API. In some embodiments, the request to create the VDS includes information that identifies a corresponding original data source and a configuration for ingesting data from that data source into the data structure (e.g., a bitmap index) of the VDS. Based on that information, the VDSM may instantiate an ingestion plugin that ingests data from the original data source into a format that can be stored in the data structure of the VDS.

Once the VDS has been created, the VDSM may begin processing data requests against the VDS instead of the underlying data source—data requests may be made and processed as the VDS is being populated with data. The data requests may be received via the API and may specify SQL queries (or other types of queries) to be executed. In some embodiments, the VDSM translates and optimizes queries directly or through its query planner into a query language understood by VDSs and then routes those translated queries to the appropriate VDS(s). The VDSM may further maintain metadata about the data that is stored at its VDSs so that the VDSM can determine which VDSs should receive a query being routed by the VDSM.

In some embodiments, the VDSM maintains a software plugin repository that includes various executable software routines that may operate on data moving into a VDS (ingest data), data moving out of a VDS (outgest data), and data at rest in VDS. When a VDS is being created, the VDS may be associated with a set of software plugins that the VDSM may use to manage that VDS. As an example, if a VDS is being created based on an Oracle® database (an original data source), then the VDSM may instantiate an ingestion plugin that is designed for ingesting data from Oracle® databases. Software plugins may also be added/associated to a VDS during its lifecycle.

The various components (e.g., VDSs, software plugins, etc.) that are managed by the VDSM may be instantiated using resources managed by the VDSM, in various embodiments. Consider an example in which the VDSM manages a pool of compute nodes. The VDSM may instantiate an API server on one of the compute nodes, a web server on another compute node, and three VDSs on multiple compute nodes. The VDSM may also scale up and down the resources that are assigned to a component based on various criteria, such as processing demand. For example, if the VDSM receives a high volume of requests for data in a certain VDS, then the VDSM may distribute that VDS across additional compute nodes.

The VDSM may implement various other functionality to facilitate the management of VDSs. For example, in various embodiments, the VDSM implements access control directly or through a software plugin to restrict who/what can interact with the VDSs. In addition to managing VDSs, the VDSM may manage and link to other VDSMs—this results in hierarchies of VDSMs. For example, an upstream VDSM may manage multiple downstream VDSMs that are located in different data centers. One of those downstream VDSMs may manage VDSs that serve as regionally located VDSs that are managed by another one of those downstream VDSMs. Accordingly, the upstream VDSM may ensure that all or a selection of the data is replicated between the two downstream VDSMs. (Exemplary selective data sharing techniques are described, for example, in U.S. Publication No.: 2018/0034824.) VDSMs may be linked with other VDSMs belonging to a single company and its subsidiaries or interconnected to VDSMs that belong to other companies.

These techniques may be advantageous as they allow for data structures, such as bitmap indexes, that "virtualize" data from an underlying data source to be managed and exploited by other software routines. As mentioned, bitmap indexes are usable to process certain data requests in a shorter amount of time than processing those data requests against a traditional database. But those bitmap indexes are ineffectual without an infrastructure to create, manage, and use those bitmap indexes, especially on a reasonably large scale. The techniques of the present disclosure provide that infrastructure with the use of VDSs and VDSMs that manage those VDSs so that bitmap indexes (or similar data structures) can be readily built on underlying data sources and used to operate on the represented data. By using VDSMs and VDSs, data can be accessed and operated on from different locations without having to create a copy of the underlying data at the different locations. As a result, this data abstraction-based approach (or alternatively, data representation-based approach) can yield up to 100× reduction in hardware footprint and data movement. This approach simplifies, accelerates, and improves control over data both within an organization and outside the organization if it is sharing the data externally with partners and vendors. The various topologies of VDSMs and VDSs enable users to access data wherever they need to access it, on premises, in the cloud, or on the edge, regardless of where the original data resides. This greatly reduces data migration costs and complexity, along with the risks typically associated with approaches that involve copying (lifting and shifting) data to where the user needs it.

The techniques of the present disclosure further overcome various deficiencies of other approaches for preparing, accessing, and analyzing data, such as a query federation approach, a data aggregation approach, and a brute force approach. In the query federation approach, a federated database system acts as a type of meta-database management system (Meta-DBMS) that provides a unified access interface to multiple, independent database systems. Each of the independent database systems can implement a different type of database (e.g., SQL database, NoSQL database, etc.) with different query languages. When a request for data is received, the federated database system obtains data from the independent database systems as the federated databases of the federated system do not store any actual data from those independent database systems. The performance of the federated database system is dependent on the speed of each of the independent database systems, thus the overall performance of the composition is only as fast as the slowest system. The techniques of the present disclosure, however, provide for a system that can maintain data representations of data stored at different underlying databases and can obtain requested data from the data representations without having to request the data from the different underlying databases. The data representations can collectively make use of the same data format, which can allow for more efficient access and analysis of the data. As such, the "data virtualization" approach described by the present disclosure is not dependent on the speed of the underlying databases unlike in the query federation approach.

In the data aggregation approach, data is physically merged from several independent databases into one central database. This approach usually involves integrations (ETL), batch processes, the pre-computation of derivative results, multiple copies of the original data, and a movement of all the data (being aggregated) across a computer network. Because the central database is normally very large in volume, query performance is a significant issue and requires further caching or loading of data into multidimensional datasets (OLAP cubes) to facilitate analysis. The techniques of the present disclosure, however, provide for a system that can manage, at a first computer network, data representations of data that is stored at an underlying database without having to move a copy of that data from a second computer network to the first computer network. Furthermore, these data representations can maintain data in a format that reduces the size of that data relative to the corresponding data that is stored at the underlying database. As a result, large amounts of data do not have to be moved across a computer network and the smaller size of the data representations allows for more efficient query performance.

Brute force approaches are usually implemented either by deploying complex data and analytical infrastructure or by applying specialized, high-performance hardware to process large volumes of computationally intensive data. The deployment of complex data and analytical infrastructures usually involves significant upfront and ongoing labor from data engineering and data operations teams. Additionally, the underlying techniques for preparing data for analysis are no different than the techniques that are used in the data aggregation and query federation approaches, and thus suffer from the same drawbacks.

Figure 1B:
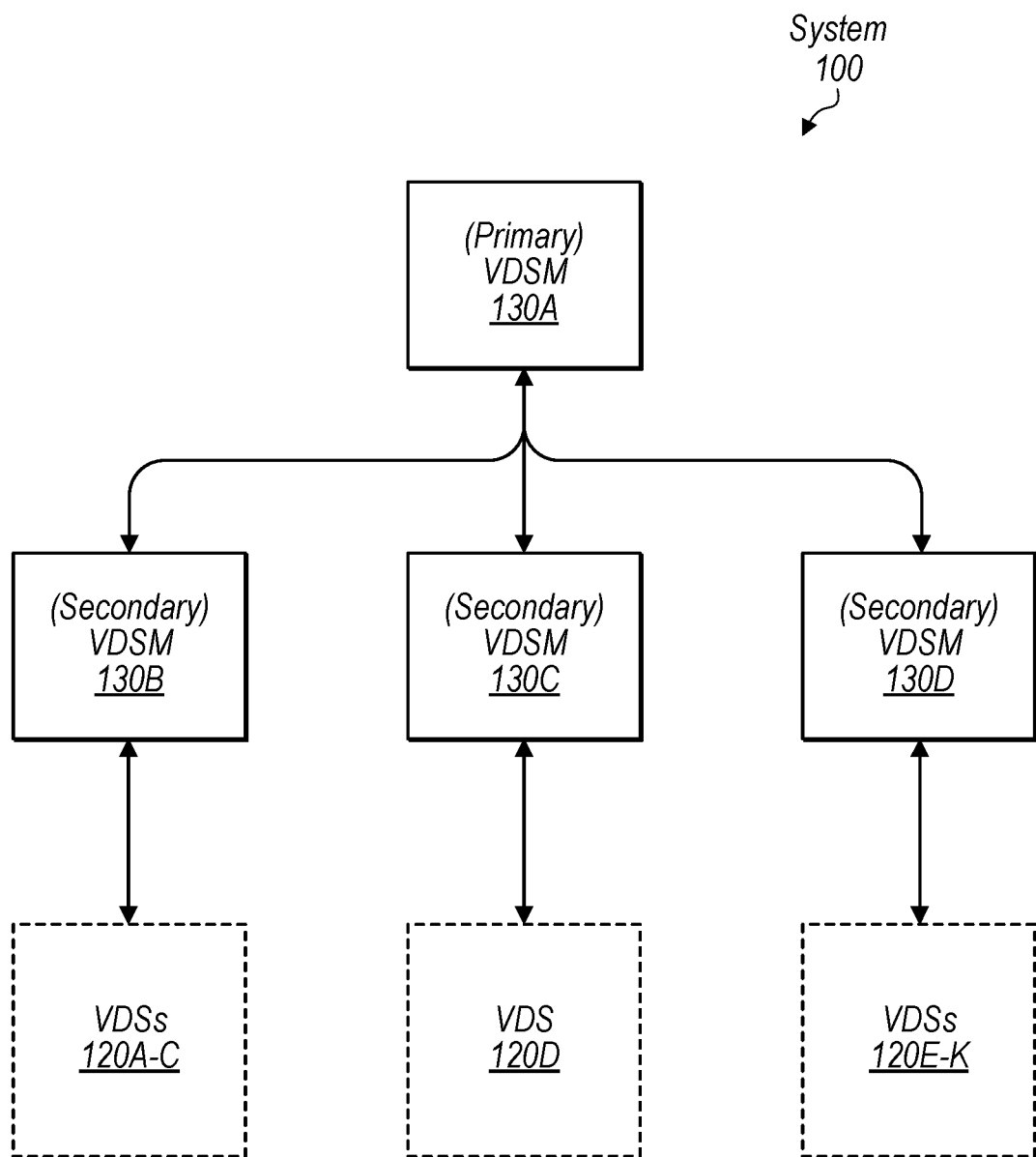
FIG. 1B is a block diagram illustrating example elements of a hierarchy of VDSMs, according to some embodiments.

Turning now to FIG. 1A, a block diagram of an example system 100 is shown. System 100 includes a set of components that may be implemented via hardware or a combination of hardware and software routines. In the illustrated embodiment, system 100 includes original data sources 110A-Z, virtual data sources (VDSs) 120A-C, and a virtual data source manager (VDSM) 130. In some embodiments, system 100 may be implemented differently than shown. As shown in FIG. 1B for example, system 100 may include a hierarchy of VDSMs 130 in which an upstream VDSM 130 controls a set of downstream VDSMs 130. FIG. 1D illustrates various possible topologies by which original data source(s) 110 are connected to VDS(s) 120.

Data sources 110, in various embodiments, are entities that serve as sources of data that are accessible by other entities. In some cases, a data source 110 may be a database comprising a collection of information that is structured and organized in a manner that allows for access, storage, and manipulation of that information. For example, a data source 110 may be a non-relational database (e.g., MongoDB®), a relational database (e.g., an Oracle® database), or an application programming interface (e.g., Salesforce.com®) that stores information on a single or multiple storage devices that are connected together on a network. That data source 110 may be available to an application server that accesses data from that data source 110 in order to generate content that may be presented to a user. In some cases, a data source 110 may be a system that collects information about an environment and/or from another system. For example, a data source 110 may be an embedded system within a cell tower that collects information about the operation of that cell tower (e.g., information about whether the cell tower is operating correctly). As another example, a data source 110 may be a system within a smartwatch that collects information about a user's health and location. In some cases, a data source 110 may be a stream/pipeline to which messages are published and consumed as part of a stream-processing platform. For example, a data source 110 may be a Kafka® topic that is part of a Kafka® cluster.

Virtual data sources (VDSs) 120 stand in contrast to original data sources 110. A "virtual data source," as used herein, refers to a software construct that includes a representation of data stored in one or more (original) data sources, as well as metadata that identifies the VDS to a higher-level software manager entity. These components are discussed further in the context of FIG. 2A below, which illustrates data representation 210, VDS API 222, and VDS metadata 230. One example of the higher-level software entity that manages a VDS 120 is VDSM 130.

Various topologies between original data sources 110 and VDSs 120 are contemplated. In FIG. 1A, VDS 120A may be a representation of original data source 110A that is created directly from source 110A. In other embodiments, such as those shown below in FIG. 1D, a VDS 120 may be connected to original data source 110 via one or more intermediate VDSs 120. Also, a VDS 120 may be created based on multiple original data sources 110. Still further, one VDS 120 may be created as a subset of data from another VDS 120. For example, a first VDS 120 might correspond to worldwide business data, while a second VDS 120 might be derived from the first VDS 120 to include only North American business data.

As an example of the representation of data stored in another data structure, VDS 120A may include a bitmap index (that is representative of data stored in a relational database) and translation key metadata that indicates how information is organized in the bitmap index. (Examples of bitmap index implementations are discussed in greater detail in U.S. Publication No. US 2015/0213463 A1, which is incorporated by reference herein in its entirety). The translation key metadata ma be usable to interpret the bitmap index so that requested data can be accessed and operated on. Other data representations are contemplated. For example, a VDS 120 may include other new and unique data formats or existing data formats, such as key-value stores (e.g., Redis® or DynamoDB®) or time-series databases (e.g., Influx DB®).

In various embodiments, a VDS 120 also includes software routines that are executable to maintain and operate on its data representation (e.g., a bitmap index), including processing queries against that data representation. For example, VDSM 130 may send a request to VDS 120A for data in its data representation. That request may include a query that is processed by the software routines of VDS 120A to return a response that includes the requested data. As discussed in more detail with respect to FIG. 2A, the software routines of a VDS 120 implement an API that allows for entities, such as VDSM 130, to send requests down to that VDS 120. In various embodiments, this API enables an ingestion routine (which may be initiated by VDSM 130) to push ingested data into the data representation of a VDS 120.

A VDS 120 may include additional metadata to facilitate the flow of data into and out of the VDS 120. This metadata may include, for example, source information that identifies an underlying data source 110 (or another VDS 120) and authentication credentials for enabling access to data from that data source 110 so that it can be ingested into the data representation of the corresponding VDS 120. Examples of metadata that can be included in a VDS are discussed in greater detail with respect to FIG. 2B.

Virtual data source manager (VDSM) 130, in various embodiments, is a set of software routines executable to manage one or more VDSs 120. Managing VDSs 120 may include, for example, creating the VDSs 120, ensuring that the data stored in those VDSs 120 is up to date, requesting data from those VDSs 120, instantiating software routines (plugins) that operate on data of those VDSs 120, and controlling access to those VDSs 120. In various embodiments, VDSM 130 includes metadata about the VDSs 120 that it manages that enables VDSM 130 to perform those enumerate functions. This metadata is discussed in greater detail with respect to FIG. 3.

As shown, VDSM 130 manages three VDSs 120A-C storing data that is representative of data stored in underlying data sources 110. Initially, VDSM 130 may start with creating one of the VDSs 120 (e.g., VDS 120A) and then may add subsequent VDSs 120 (e.g., VDS 120B and 120C) over time to its configuration, arriving at the illustrated embodiment. In some cases, when adding a VDS 120 to its configuration, VDSM 130 may create that VDS 120. This may involve supplementing information (e.g., a location corresponding to an underlying data source 110) provided by a user or agent with information (e.g., a transfer protocol) that is obtained by communicating with the corresponding underlying data source 110. (This is illustrated by the dotted line connecting VDSM 130 with data sources 110). VDSM 130 may then instantiate an ingestion routine that ingests data from the corresponding underlying data source 110 into the VDS 120. In some cases, when adding a VDS 120 to it configuration, VDSM 130 may load a previously created VDS 120 that had been temporally stored.

In some cases, VDSs 120A-C may be created based on different data sources 110. For example, VDS 120A may be created based on a relational database operated by a first company while VDS 120B is created based on a non-relational database operated by a second, different company. In some cases, some of VDSs 120A-C may be created based on the same data source 110 but correspond to different data partitions of that data source 110. For example, VDS 120A may correspond to data of a first tenant while VDS 120B corresponds to data of a second tenant that is associated with the same database.

After adding a VDS 120 to its configuration, VDSM 130 may start issuing requests for data against that VDS 120 instead of the corresponding data source 110. As a result, the VDS 120 may act as a "virtual" layer between VDSM 130 and the corresponding data source 110 that virtualizes the data from that data source 110. Virtualizing data from the data source 110 may involve the VDS 120 storing data in a different format (e.g., in a bitmap-based format instead of a table-based format) that still conveys the same information as the data that is stored in the underlying data source 110. By using the different format, VDSM 130 may be able to process certain requests for information against its VDSs 120 instead of the underlying data sources 110.

Turning now to FIG. 1B, a block diagram of a hierarchy of VDSMs 130 within system 100 is shown. In the illustrated embodiment, system 100 includes a "primary" VDSM 130A, "secondary" VDSMs 130B-D, and VDSs 120A-K. As further depicted, VDSM 130B manages VDSs 120A-C, VDSM 130C manages VDS 120D, and VDSM 130D manages VDSs 120E-K. In some embodiments, system 100 may be implemented differently than shown—e.g., system 100 may not include a hierarchy of VDSMs 130 as shown in FIG. 1A.

As illustrated, a VDSM 130 can manage one or more VDSMs 130. As used herein, the term "primary VDSM" refers to the VDSM 130 that resides at the top of a hierarchy of VDSMs 130, the term "secondary VDSM" refers to a VDSM 130 that resides in the next level down in that hierarchy, and the term "tertiary VDSM" refers to a VDSM 130 that resides in the yet next level down. While not shown, in some embodiments, a VDSM 130 may manage a combination of VDSs 120 and VDSMs 130 that reside in the next level down from that VDSM 130.

A VDSM 130 may manage multiple VDSMs 130 for various reasons. In some cases, a company may wish to have data replicated across multiple locations to ensure high availability of that data or to enable data access at an edge location. Accordingly, a secondary VDSM 130 may be placed at each location that manages a set of VDSs 120 that store data representing a copy of the data being partially or fully replicated. The primary VDSM 130 may communicate with those secondary VDSMs 130 to facilitate the exchange of data between them in order to ensure that data is replicated between the different locations. In some cases, a company may wish to collect particular information from multiple devices (e.g., Internet of Things devices) that are scattered across a geographic region. As such, a secondary VDSM 130 may be instantiated on each device and manage a set of VDSs 120 that are created based on data collected by components of that device. The secondary VDSMs 130 may further instantiate software plugins that perform an analysis on the data using the VDSs 120. A result of the analysis may be pushed up to the primary VDSM 130 that stores the result using VDSs 120 managed by the VDSM 130—the primary VDSM 130 may serve as a central location for collecting results to present to a user.

Figure 1C:
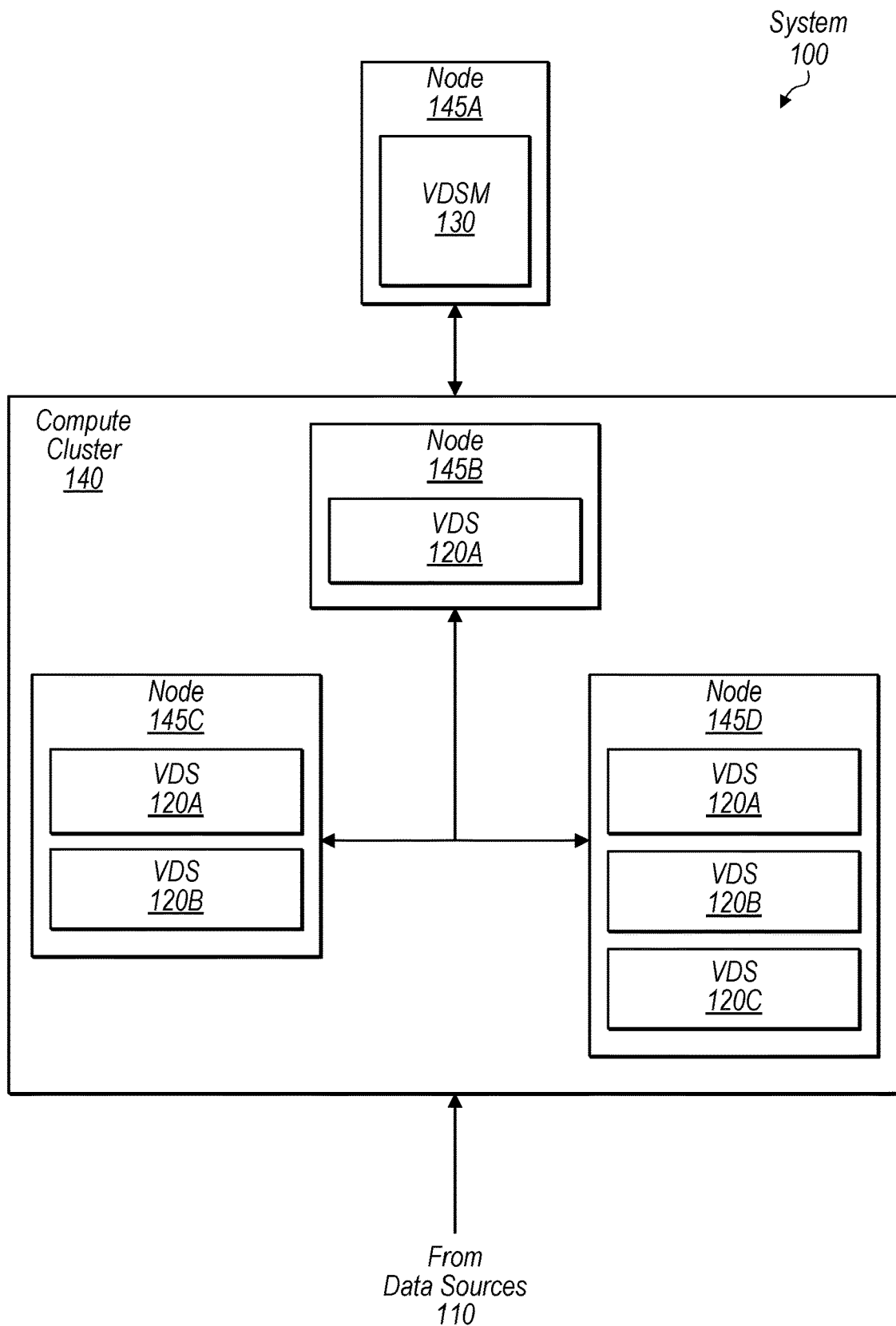
FIG. 1C is a block diagram illustrating example elements of a layout of components of the system on nodes of a compute cluster, according to some embodiments.
Figure 1D:
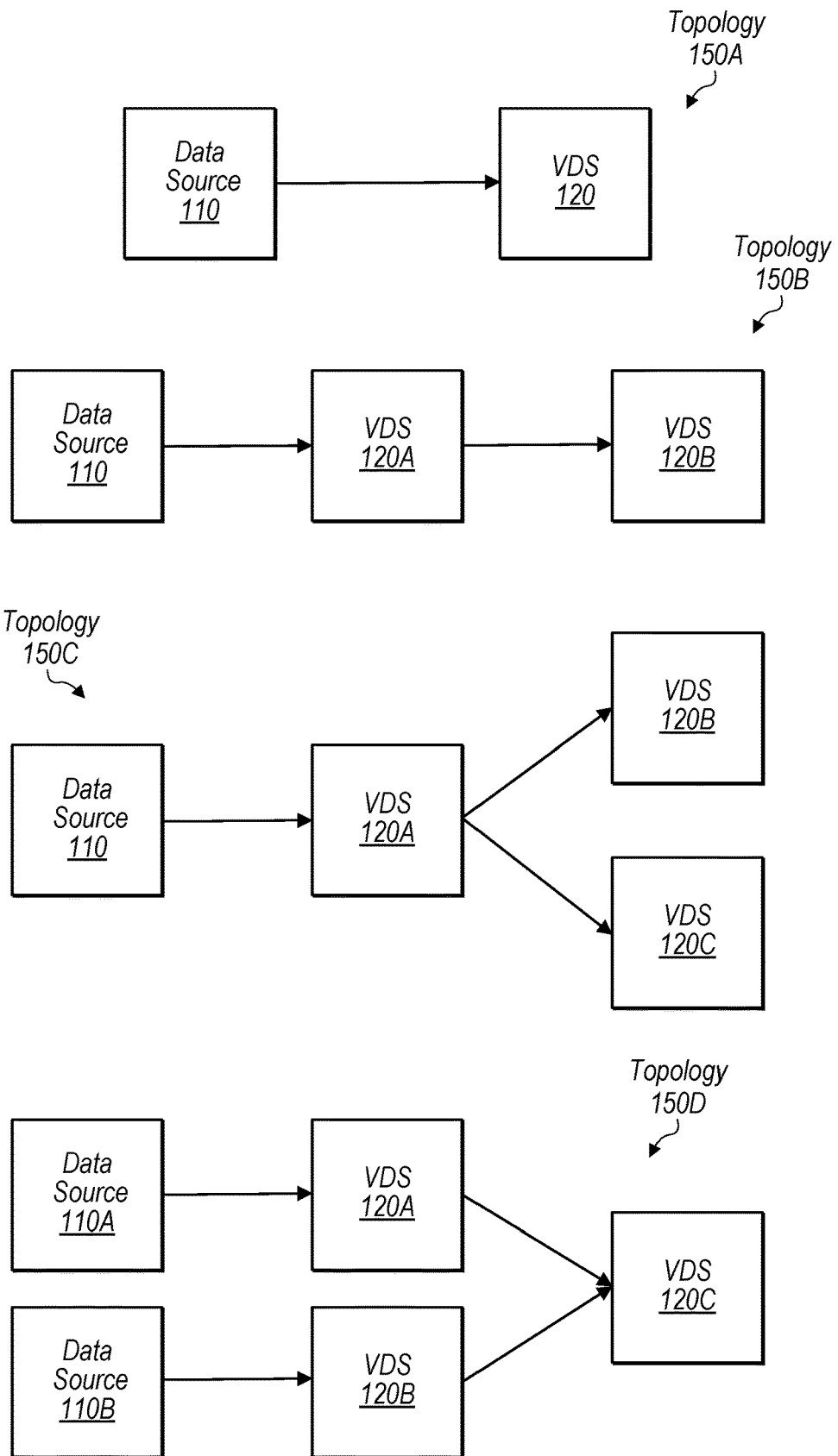
FIG. 1D is a block diagram illustrating example topologies between data sources and VDSs, according to some embodiments.

Turning now to FIG. 1C, a block diagram of an example layout of components of system 100 on nodes 145 is shown. In the illustrated embodiments, system 100 includes a node 145A and a compute cluster 140 having nodes 145B-D. As further illustrated, node 145A includes a VDSM 130, node 145B includes VDS 120A, node 145C includes VDS 120A and 120B, and node 145D includes VDSs 120A-C. In some embodiments, system 100 may be implemented differently than shown. For example, VDSM 130 might execute on a node 145 within compute cluster 140.

Figure 3:
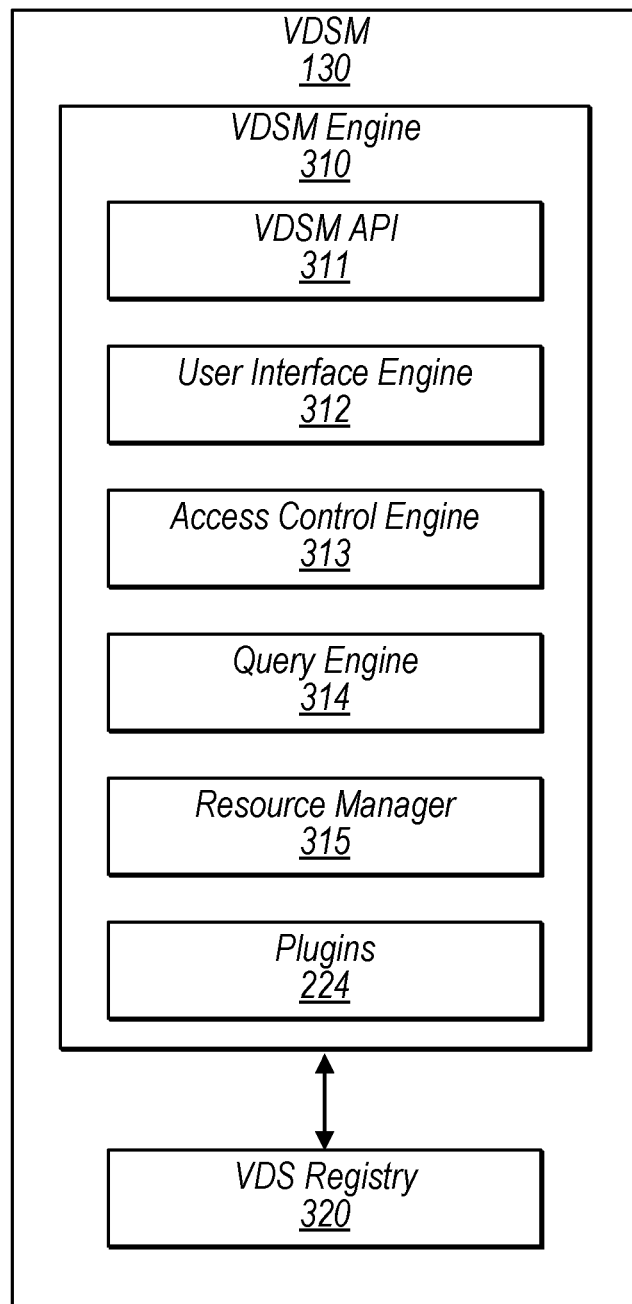
FIG. 3 is a block diagram illustrating example elements of a VDSM, according to some embodiments.

Compute cluster 140, in various embodiments, is a pool of resources managed and used by VDSM 130—this pool of resources may include resources that are managed by the resource manager discussed in more detail with respect to FIG. 3. Compute cluster 140 may be used to implement services of VDSM 130 (e.g., an API server) and a VDS environment having one or more VDSs 120. As shown, compute cluster includes nodes 145B-D. In various embodiments, a node 145 corresponds to a set of hardware processors, physical storage, network storage, and memory that is available to VDSM 130 for executing software routines and storing data. In some embodiments, a node 145 can be a virtual machine—this might provide VDSM 130 with less granular control than managing a set of hardware processors, storage, and memory. The resources of compute cluster 140 may correspond to resources that are managed by a different entity than the entity operating VDSM 130. For example, compute cluster 140 may correspond to servers and storage provided by AWS while VDSM 130 is operated by another party. In some embodiments, VDSM 130 may scale up and down the resources that are included in compute cluster 140.

As explained, VDSM 130 may execute software routines (e.g., API servers, VDSs 120, etc.) using the resources of compute cluster 140. In various embodiments, a portion or all of a VDS 120 can be compiled into an executable binary that can be executed on one or more nodes 145 to together implement the VDS 120. Those binaries may be operable to communicate with each other to implement functionalities of that VDS 120, such as a join query operation. As shown for example, VDS 120A executes on three nodes 145 while VDS 120C executes on only one node 145 (i.e., node 145D). When a VDS 120 is distributed across multiple nodes 145, the data of that VDS 120 may be partitioned into segments/slices/shards/partitions that are distributed across those nodes 145. Consider an example in which VDS 120C includes a bitmap index having 3000 columns, each of which may correspond to a user. VDS 120C might be partitioned such that node 145B manages the data of columns 1-1000, node 145C manages the data of columns 1001-2000, and node 145D manages the data of columns 2001-3000. In some embodiments, the metadata that is associated with a VDS 120 may be replicated across multiple nodes 145 such that each node 145 stores a copy of that metadata. For example, VDS 120C may include translation metadata that allows for the bit strings of its bitmap index to be interpreted so that data can be accessed and operated on. This translation metadata can be replicated to nodes 145B-D so that they all have their own respective copy.

Turning now to FIG. 1D, a block diagram of example topologies between original data sources 110 and VDSs 120 are shown. In the illustrated embodiment, topology 150A includes a VDS 120 that is created directly from an original data source 110. In this case, that original data source 110 is an "origin" of data for that VDS 120—the data source that is directly used to create the VDS. In some cases, the origin of a VDS 120 is an "original" data source 110, as in topology 150A, yet in other cases, the origin of a VDS 120 may be a "derived" data source 110, such as another VDS (e.g., belonging to a research partner) that is derived from an original data source 110, as in topology 150B. A VDS 120 may also have more than one origin in some cases.

Topology 150B, for example, includes a VDS 120B that is connected to an original data source 110 via an intermediate VDS 120A. Within the context of topology 150B, while VDS 120B is connected to data source 110, VDS 120A is the origin of data for VDS 120B, not data source 110. That is, VDS 120B obtains its data directly from VDS 120A and not data source 110 and thus VDS 120A is the origin of data. In some cases, VDS 120B may be a copy of VDS 120A—e.g., VDS 120A might be a United States-based VDS 120 while VDS 120B is a European counterpart. As further shown, topology 150C includes two VDSs 120B and 120C that are connected to an original data source 110 via the same intermediate VDS 120A. For example, VDS 120A might include business data for the entire United States while VDS 120B might include the business data for California and VDS 120C includes the business data for Texas. As further shown in the illustrated embodiment, topology 150D includes a VDS 120C that is connected to two original data sources 110A and 110B via two respective VDSs 120A and 120B that are the origins of data for VDS 120C. Other topologies 150 are contemplated. As an example, a topology 150 may include a series of VDSs 120 (e.g., eight VDSs 120) in which a given VDS 120 of the series is an origin of data for the next VDS 120 in that series. In short, the various topologies indicated in FIG. 1D, which are by no means exhaustive, illustrate how a VDS can be connected to an original data source in various ways—either directly (no intermediate VDSs) or indirectly (via one or more intermediate VDSs).

Figure 2A:
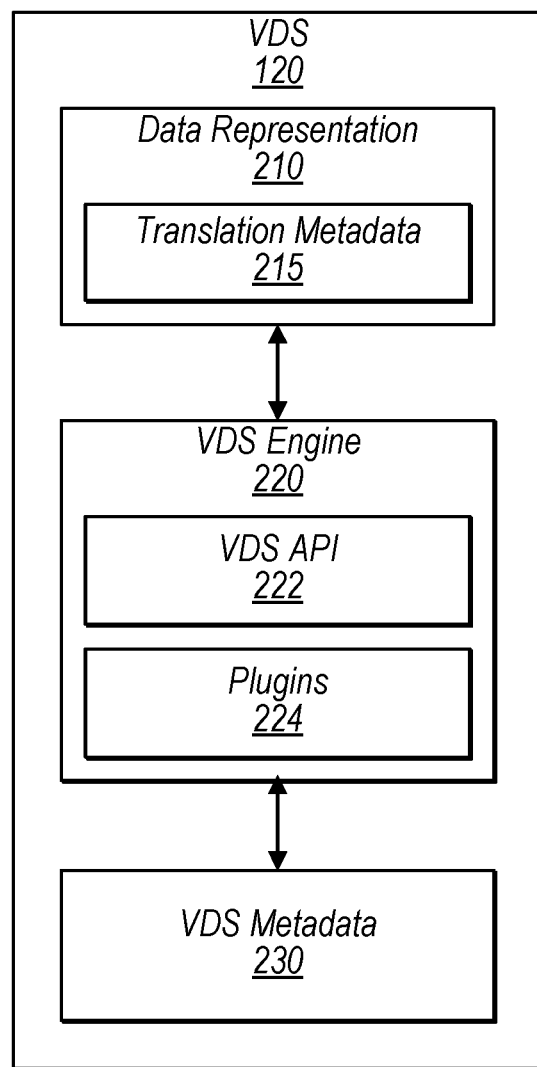
FIG. 2A is a block diagram illustrating example elements of a VDS, according to some embodiments.

Turning now to FIG. 2A, a block diagram of an example VDS 120 is shown. In the illustrated embodiment, VDS 120 includes data representation 210, a VDS engine 220, and VDS metadata 230. As shown, data representation 210 includes translation metadata 215, and VDS engine 220 includes a VDS API 222 and plugins 224. In some embodiments, VDS 120 may be implemented differently than shown. For example, VDS 120 may not include plugins 224.

Data representation 210, in various embodiments, is a data structure that stores data that is representative of data stored at one or more original data sources 110. Data representation 210 may store its data in a different format than the data stored at the original data sources 110. For example, data representation 210 may be a bitmap index comprising multiple rows of bit strings. The bits within a given row may be set based on data in the original data sources 110. Consider an example in which an original data source 110 includes a table of user profiles, each of which identifies the gender of its corresponding user. Data representation 210 may include a bitmap index of users, where the bitmap index includes at least two rows: a bit string corresponding to the gender "male" and a bit string corresponds to the gender "female." Each column of the bitmap index may correspond to a user. Consequently, if a user is a female, then the corresponding bit of the "male" bit string is set to "0" and the bit of the "female" bit string is set to "1." While the user profile table of the original data source 110 may store a character string of "female" and the user bitmap index may include a set bit, they both convey the same information (i.e., the gender of the user), but in different data formats. In this manner, data representation 210 may store data that is representative of data stored at the original data source 110.

Translation metadata 215, in various embodiments, includes information that enables the data of data representation 210 to be interpreted. Translation metadata 215 may include, for example, value keys, record keys, and record attributes. Continuing with the example about the two bit strings that correspond to the two genders. The bitmap index of users may include thousands of bit strings (which include the two bit strings for gender) that are grouped together to form a matrix of columns and rows. Translation metadata

215 may indicate the meaning of each bit string that makes up the bitmap index of users. For example, translation metadata 215 may include a value key "male" that is linked to the bit string corresponding to whether a user is a male and a value key "income greater than 10 k" that is linked to a bit string corresponding to whether a user's income exceeds $10,000. In various embodiments, translation metadata 215 categorizes record keys into groups. For example, those two previously mentioned value keys may be grouped under "demographic data." Record keys may define a mapping between bit positions of a bit string and a corresponding record. For example, a record key may indicate that the first bit of a bit string (or the first bit of a portion or all bit strings in the bitmap index) corresponds to user "A". Record attributes may specify information associated with a record (column) that is not represented by a bit string. For example, email addresses are often unique values and as a result, it might not be desirable to represent them using a bit string; however, it may still be desirable to associate a record with an email address. As such, a record attribute may specify an email address for a record, such as the record corresponding to user A.

As mentioned, translation metadata 215 may be replicated across each node 145 that is implementing VDS 120. For example, as depicted in FIG. 1C, VDS 120A is distributed among nodes 145B-D. This distribution may be such that each node 145 manages a slice/segment of data representation 210 of VDS 120A (e.g., each node 145 may manage a different set of columns of a bitmap index). In some embodiments, a node 145 maintains, for its portion of a distributed VDS 120, only the translation metadata 215 that is relevant to its slice. In various embodiments, however, a node 145 maintains a complete copy of the translation metadata 215 (or a portion thereof—e.g., only the value keys may be copied) that pertains to the entirety of data representation 210.

As updates are made to the data of data representation 210 (e.g., based on changes to data at the origin, such as an underlying data source 110 or another VDS 120), VDS engine 220 may modify translation metadata 215 based on those updates. For example, if a new bit string is added to data representation 210 (in the case where it is a bitmap index), a value key may be added to translation metadata 215 to indicate the meaning of the new bit string (e.g., "users with a dog"). The changes that are made to translation metadata 215 may be propagated to each node 145 that implements the corresponding VDS 120.

VDS engine 220, in various embodiments, includes the executable software routines of VDS 120 that are capable of facilitating access and manipulation of data representation 210 and VDS metadata 230. VDS engine 220 may further maintain data representation 210 and VDS metadata 230 by ensuring that changes to data at the origin for VDS 120 (e.g., an original data sources 110) are reflected in index 210 and metadata 230. As illustrated, for example, VDS engine 220 includes VDS API 222 and plugins 224.

VDS API 222, in various embodiments, is an interface provided by VDS engine 220 to allow for entities (e.g., VDSM 130) that are outside of VDS 120 to access and manipulate the components within VDS 120. In various embodiments, VDS API 222 includes a set of query functions that are invokable to query data representation 210 for data. Consequently, a data request received by VDSM 130 for particular data may be propagated down to the appropriate VDSs 120 via calls to the query functions of VDS API 222. In various cases, VDSM 130 may invoke the query functions of one of the VDSs 120 that is selected by VDSM 130. The selected VDS 120 may then propagate queries from VDSM 130 to the remaining VDSs 120 of compute cluster 140 via their VDS APIs 222.

Plugins 224, in various embodiments, are sets of software routines that are executable to perform a specified set of operations in relation to VDS(s) 120 and/or VDSM(s) 130. Plugins 224 may generally fall within one of three types of categorizations (although, there are others): ingest plugins 224 that operate on data moving into VDS 120, consumption plugins 224 that operate on data moving out of VDS 120, and at-rest plugins 224 that operate on data at rest within VDS 120. Ingest plugins 224, consumption plugins 224 (alternatively, "outgest" plugins), and at-rest plugins 224 are discussed in greater detail with respect to FIGS. 4A, 4B, and 4C. Other types of plugins 224 can include monitoring plugins 224 that may collect metrics about the operation of a VDS 120 and security plugins 224 that may enforce security policies, execute access control directives, encrypt data, and/or generate secure connections between a VDS 120 and another component (e.g., another VDS 120).

In some embodiments, VDS 120 spawns plugins 224 in response to requests received via its VDS API 222 or based on a defined trigger event (e.g., detecting a change to particular data in data representation 210). In various embodiments, VDS 120 relies on VDSM 130 to spawn plugins 224 and instead stores metadata about the particular plugins 224 associated with VDS 120. In some embodiments, VDS 120 may store and spawn a subset of the plugins 224 associated with it while VDSM 130 may spawn other plugins 224 that are associated with VDS 120.

VDS metadata 230, in various embodiments, includes information that can be used to facilitate the movement of data into and out of VDS 120. For example, VDS metadata 230 may specify a location of an origin of data for VDS 120 (e.g., a data source 110), parameters for accessing data from that location, and/or a location at which to store data ingested from the origin. Examples of the different types of information that may be included in VDS metadata 230 are discussed in greater detail with respect to FIG. 2B. VDS metadata 230, in various embodiments, is accessible to entities outside of VDS 120. For example, an ingestion plugin 224 (which may be spawned by VDSM 130) may access or be provided VDS metadata 230 so that it can connect with an underlying data source 110 and begin ingesting data into data representation 210.

Figure 2B:
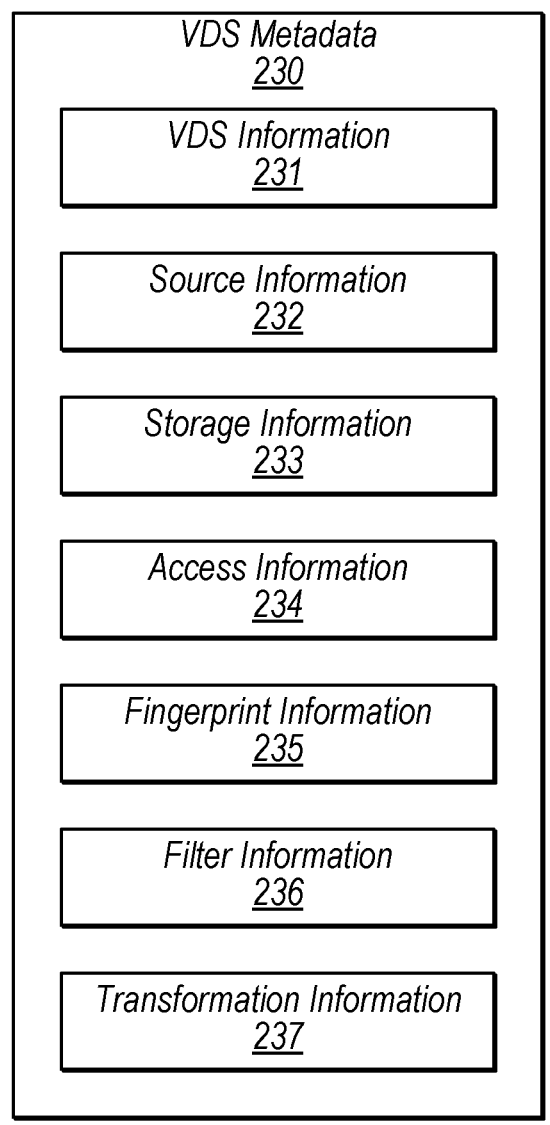
FIG. 2B is a block diagram illustrating example elements of VDS metadata, according to some embodiments.

Turning now to FIG. 2B, a block diagram of example VDS metadata 230 is shown. In the illustrated embodiment, VDS metadata 230 includes VDS information 231, source information 232, storage information 233, access information 234, fingerprint information 235, filter information 236, and transformation information 237. In some embodiments, VDS metadata 230 may be implemented differently than shown. For example, VDS metadata 230 may not include fingerprint information 235.

VDS information 231, in various embodiments, includes information describing one or more general properties pertaining to a VDS 120. VDS information 231 may specify a unique identifier that allows for the corresponding VDS 120 to be directly referenced separately from other VDSs 120. This unique identifier, in some embodiments, is assigned by VDSM 130 to a VDS 120 upon creation of the VDS 120. If a VDS 120 has a data source that is another VDS 120 (e.g., topology 150B in FIG. 1D), then those two VDSs 120 may be assigned different identifiers. VDS information 231 may specify a version associated with the corresponding VDS 120, a human-readable name separate from the unique identifier, and/or a text description of the VDS 120, which may be provided by a user.

Source information 232, in various embodiments, includes information describing the one or more origins (e.g., underlying data sources 110) whose data is represented by a data representation 210 of a VDS 120. As mentioned, when a user (e.g., an administrator) wishes to create a VDS 120, that user may identify, e.g., one or more underlying data sources 110 to be used to create the VDS 120—those underlying data sources 110 may be identified by another entity, such as a set of files stored in a database accessible to VDSM 130. VDSM 130 may then store information that it obtains about the underlying data sources 110 as source information 232 in the VDS 120 being created. In various embodiments, source information 232 enables VDSM 130 or another component (e.g., a plugin 224) to access data from those underlying data sources 110 so that the data can be operated in some manner. As discussed in FIG. 4A for example, an ingest plugin may use source information 232 to access the origin(s) of data for VDS 120 (e.g., underlying data sources 110 or VDSs 120) so that it can ingest data from those origins to create and/or maintain a data representation 210.

In some cases, source information 232 may specify an underlying data source 110 that corresponds to a storage service provided by a cloud platform. For example, source information 232 may specify one or more Amazon® S3 buckets that store files having data objects that can be parsed. Source information 232 may further specify authorization credentials that allow for access to that storage service. Continuing with the previous example, that source information 232 may specify an Amazon Web Service® (AWS) access identifier and access secret. Source information 232 may also specify a data format (e.g., JSON, CSV, etc.) of the data that is being accessed so that it can be correctly parsed.

In some cases, source information 232 may specify an underlying data source 110 that corresponds to a stream-processing platform in which messages are published to and consumed from streams (or alternatively, "pipelines"). For example, source information 232 may specify a host address of a Kafka® cluster, an identifier of a Kafka® topic (a pipeline), and/or a schema registry address. Source information 232 may specify a data format (e.g., JSON, Avro, etc.) of the data objects included in messages of a pipeline so that they can be correctly parsed.

In some cases, source information 232 may specify an origin that corresponds to a VDS 120—that is, one VDS 120 is the source of data for another VDS 120. When the two VDSs 120 are managed by the same VDSM 130, source information 232 may specify an identifier of the VDS 120 that is being used as an origin of data. If the source VDS 120 is managed by another VDSM 130, then source information 232 might specify, in addition to an identifier of the source VDS 120, an endpoint address for that other VDSM 130.

Other types of underlying data sources 110 than those discussed above may be specified by source information 232. For example, source information 232 may specify a local relational, non-relational database, or a remote API whose data can be ingested. In some embodiments, a VDS 120 can have multiple underlying data sources 110 that are of the same or different types. For example, a VDS 120 might be created based on an Amazon® S3 bucket and another VDS 120 or based on three VDSs 120.

Storage information 233, in various embodiments, includes information describing one or more locations where data of data representation 210 is stored. In various cases, storage information 233 may specify that the data of index 210 resides locally on compute cluster 140 or a data store managed by VDSM 130. In some cases, storage information 233 may specify a location that corresponds to a cloud storage service, such as AWS S3. The corresponding VDS 120 may not be actively loaded/running in compute cluster 140, but rather offloaded at the cloud storage service until requested—data may be loaded into compute cluster 140 to process certain requests and then offloaded back to the cloud storage service. In some cases, storage information 233 may specify a network-attached storage (NAS) where a VDS 120 can be offloaded while not being used and then reloaded at another time, similar to the cloud storage service approach. In some cases, storage information 233 may indicate the data files are currently bundled with the corresponding VDS 120—this may allow for the VDS 120 to be transferred to another compute cluster 140 without requiring any external connectivity (e.g., to a cloud storage service.)

Access information 234, in various embodiments, includes information describing who can access data from data representation 210 and what data can be accessed. For example, access information 234 might specify that a user A has access to columns 1-1000 and a user B has access to columns 1-2000 of a bitmap index. In some cases, access information 234 may simply specify who can access the corresponding data representation 210 without limiting the data that can be accessed. For example, access information 234 may specify that users A and B can access the corresponding data representation 210 while user C cannot.

Fingerprint information 235, in various embodiments, includes information that serves as a representation of a VDS 120 that may be used to determine if VDSs 120 are different. In some cases, fingerprint information 235 specifies metrics about the data of a data representation 210. Such metrics may include the number of rows and columns of the data representation 210 (if a bitmap index is used as index 210 for example), types of columns (e.g., integer, character, etc.), and the data density of data representation 210. In some embodiments, fingerprint information 235 specifies the mean, median, mode for defined list of columns.

Filter information 236, in various embodiments, includes information that identifies a mapping between the data of a VDS 120 and data of the corresponding origin of data (e.g., an underlying data source 110). The mapping may specify associations between data fields of the VDS 120 and data fields of the origin. Consider an example in which a data source 110 includes fields [A, B, C, D]. Filter information 236 may identify a mapping of [A, B, C, D]→[A, B, K, Z], where [A, B, K, Z] are data fields in the data representation 210 of the VDS 120. Filter information 236 may specify a field name for the VDS 120 that is different from the field name of the origin—e.g., [D]→[Z]. Filter information 236, in various embodiments, is usable to filter what data is selected from a data source 110. Continuing with the previous example, filter information 236 may identify a mapping of [A, B, C, D]→[A, B, D]. As a result, the data from the data field [C] of the origin is not included in the corresponding VDS 120.

Transformation information 237, in various embodiments, includes information that identifies a set of transformation to perform on data that is being ingested from the origin of data (e.g., an underlying data source 110) into the VDS 120. For example, transformation information 237 may specify a transformation from a value of a "birthday date" field of a data source 110 to an age value that can be stored in an "age" field of a VDS 120. In various cases, filter information 236 and transformation information 237 is accessed by an ingestion plugin 224 so that it can ingest data from a data source 110 into a corresponding VDS 120.

Turning now to FIG. 3, a block diagram of an example VDSM 130 is shown. In the illustrated embodiment, VDSM 130 includes a VDSM engine 310 and a VDS registry 320. As further illustrated, VDSM engine 310 includes plugins 224, a VDSM API 311, a user interface engine 312, access control engine 313, query engine 314, and resource manager 315. In some embodiments, VDSM 130 may be implemented differently than shown. For example, VDSM 130 may not include plugins 224.

VDSM engine 310, in various embodiments, includes the executable software routines of VDSM 130 that allow for VDSM 130 to manage one or more VDSs 120, including creating those VDSs 120 and processing data requests against them. In some embodiments, the software routines of VDSM 130 also enable VDSM 130 to manage one or more other VDSMs 130 of a hierarchy of components that include VDSs 120 and VDSMs 130. In some embodiments, the execution of VDSM engine 310 is distributed across multiple computer systems. For example, resource manager 315 may execute on a first node 145 while an API server, which implements VDSM API 311, executes on a second, different node 145.

VDSM API 311, in various embodiments, is an interface that allows for entities (e.g., a user, another VDSM 130, etc.) to access the functionality and information of VDSM 130 and its managed VDSs 120. In various embodiments, VDSM API 311 supports callable functions that include a create VDS function, a delete VDS function, a list VDSs function, a query VDS function, a backup VDS function, and a clone VDS function. The create VDS function may be callable to create a VDS 120 and may receive, as input, information that identifies an origin of data for that VDS 120 (e.g., an underlying data source 110) along with parameters (e.g., VDS metadata 230) for configuring an ingestion plugin 224 to ingest data from that origin into the data representation 210 of the VDS 120. In some cases, the create VDS function may load a previously created VDS 120 from a storage device into compute cluster 140—the create VDS function may receive the unique identifier for that VDS 120 as an input.

The delete VDS function may be callable to delete a VDS 120 or offload the VDS 120 from compute cluster 140 to a storage location—the delete VDS function may receive, as input, the unique identifier for that VDS 120 and an address of a storage location if applicable. The list VDSs function may be callable to list the VDSs 120 that are managed by VDSM 130 and information about those VDSs 120, such as their VDS metadata 230, in some cases. The backup VDS function may be callable to create a backup VDS 120 of a specified VDS 120—the backup VDS 120 may be stored away. The clone VDS function may be callable to clone a specified VDS 120. The query VDS function may be callable to issue a query against one or more VDSs 120—this function can be implemented by query engine 314 as discussed below.

User interface engine 312, in various embodiments, provides user interfaces that serve as a frontend to VDSM API 311. These user interfaces may enable a user to select from various options (e.g., via dropdown menus) to configure their VDS environment. As an example, user interface engine 312 may send user interface information to a computer system of the user and that computer system may then present a user interface for creating/adding a VDS 120 based on the user interface information. The user may select a data source 110 (e.g., from a dropdown menu that includes a list of data sources 110), a location at which to store data of the VDS 120 (e.g., selected from another dropdown menu), a data format corresponding to the selected data source 110, etc. The user may further select plugins 224 from a list of plugins 224 to be used in relation to the VDS 120 being created. The information that is provided by the user via the user interface may be passed to VDSM 130 via functions of VDSM API 311 (e.g., the create VDS function). In some embodiments, user interface engine 312 supports command line tools, such as the Python command line, as a way to interact with VDSM 130 and VDSs 120.

In addition to enabling a user or another entity to invoke the functionality of VDSs 120 and VDSM 130, user interfaces may present information obtained from VDSs 120 and VDSM 130. For example, if a query is issued to VDSs 120, the results of that query may be presented to a user via a user interface. As another example, a user may wish to see analytical information about their VDS environment. Accordingly, a user interface may display an amount of storage occupied by a set of VDSs 120, an average amount of time that a query takes to execute against the set of VDSs 120, etc.

Access control engine 313, in various embodiments, controls access to the functionality and data of VDSM 130 and its VDSs 120. In various embodiments, access control engine 313 maintains a list of users and approved actions that those users can perform. For example, access control engine 313 may include an access rule that indicates that user A can issue queries to a particular VDS 120 for data. That access rule may further indicate that user A can access only a subset of data of that particular VDS 120—e.g., user A can access data from columns 1-1000 of a bitmap index 210 included in the particular VDS 120. When a request is received at VDSM 130 via VDSM API 311, in various embodiments, access control engine 313 checks the request against the list of users and approved actions to determine whether to permit the request to be processed. If the request is attempting to access data or perform an action that is not approved, then access control engine 313 may reject the request; otherwise, the request may be processed by VDSM 130.

In various embodiments, VDSM 130 maintains a plugin repository that stores various plugins 224 that may be instantiated by VDSM 130 to perform operations in relation to VDSs 120. As mentioned previously, there are various types of plugins 224 that include, for example, ingest plugins 224, consumption plugins 224, consumption plugins 224, monitoring plugins 224, and security plugins 224. In various embodiments, VDSM 130 associates a VDS 120 with a set of plugins 224 to be used with that VDS 120—those plugins 224 might be identified by the user whose creates that VDS 120. As an example, VDSM 130 may present a plugin store to a user and the user may pick and choose plugins 224 from the store to be associated with their VDS 120. VDSM 130 may maintain information about how plugins 224 are being used and by what VDSs 120. Two given VDSs 120 may be associated with different sets of plugins 224. In some embodiments, access control engine 313 controls who can access plugins 224 and the particular plugins 224 that they can access.

Query engine 314, in various embodiments, facilitates the execution of queries against the VDSs 120 that are managed by VDSM 130. Query engine 314 may receive, from a user or another entity via a query function of VDSM API 311, a data request that specifies one or more queries to be executed against one or more VDSs 120. In some cases, the one or more queries may be from a query language (e.g., SQL) that is different than the query language understood by VDSs 120 (e.g., the Pilosa Query Language). Accordingly, query engine 314 may translate the one or more queries into the query language that is understood by VDSs 120. Query engine 314 may further determine which of the VDSs 120 that are managed by VDSM 130 are relevant to the one or more queries. In some embodiments, query engine 314 accesses information from VDS registry 320 that identifies the data that is stored at the individual VDSs 120. Based on the data being queried and the data stored at the individual VDSs 120, query engine 314 may determine one or more VDSs 120 that should receive the one or more queries. Query engine 314 may then route the queries to those VDSs 120.

When routing a query to a VDS 120 whose data representation 210 has been sliced and distributed across multiple nodes 145, in various embodiments, query engine 314 selects one of the nodes 145 as a "representative" node that is responsible for distributing the query to the remaining nodes 145 and returning a collective result of the VDS 120. In some embodiments, nodes 145 elect one of the nodes 145 to be the representative node and present this election to query engine 314 so that query engine 314 can route the query. As such, the portion of a VDS 120 running on a given node 145 may include metadata that identifies the other nodes 145 that are running the same VDS 120 and software routines that are executable to route, based on that metadata, the query to the appropriate nodes 145. The representative node may receive results back from those nodes 145 and may compile those results into a collective result that is returned to query engine 314. In some embodiments, query engine 314 randomly selects the representative node from the nodes 145 that are implementing a particular VDS 120. In yet some embodiments, query engine 314 implements a selection scheme, such as a round robin scheme, or assesses the current workload of the corresponding nodes 145 and selects a node 145 that is not overloaded.

Resource manager 315, in various embodiments, allocates and deallocates resources in order to facilitate the operation of system 100, including VDSM 130 and VDSs 120. In various embodiments, resource manager 315 is supplied with a pool of resources that can be allocated to implement the various functionalities of VDSM 130 and VDSs 120. For example, the pool of resources might include 20 virtual machines that are available on nodes 145. Consequently, resource manager 315 may use one virtual machine to run an API server that provides VDSM API 311, another virtual machine to run a web server to implement user interface engine 312, several virtual machines to implement a set of VDSs 120, etc. As another example, the pool of resources may correspond to a cluster managed by an orchestration unit, such as Kubernetes™ or an AWS service. Accordingly, resource manager 315 may interface with the orchestration unit to implement the various functionalities of VDSM 130 and VDSs 120, which may involve providing the orchestration unit with configuration files (e.g., YAML files) that can be used to instantiate those entities.

In various embodiments, resource manager 315 can scale up or down the resources that are provided to a particular entity or service. As an example, when a VDS 120 is being created, resource manager 315 may initially scale up the resources (e.g., nodes 145) that are provided to implement the ingestion plugin 224 that is consuming data from the underlying data source 110. After a bulk of the data has been consumed, such that only changes to the data of the data source 110 need to be ingested for example, resource manager 315 may scale down/deallocate the resources provided for continuing the implementation of that ingestion plugin 224. As yet another example, if VDSM 130 is receiving a high volume of queries to be executed against a particular VDS 120, then resource manager 315 may scale up the resources (e.g., nodes 145) that are provided to implement that particular VDS 120. Resource manager 315 may then scale down the resources provided to that particular VDS 120 as the volume of queries decreases.

VDS registry 320, in various embodiments, stores information about the VDSs 120 that are managed by VDSM 130. This information may include the VDS metadata 230 from each of those VDSs 120—that is, VDS registry 320 may store a copy of the VDS metadata 230 of each VDS 120 managed by VDSM 130. As mentioned, query engine 314 may route queries to VDSs 120 that are identified based on information in VDS registry 320. In particular, in some cases, query engine 314 may access filter information 236 that is included in the VDS metadata 230 copies. As explained above, filter information 236 may identify a mapping between data fields of a VDS 120 and data fields of an underlying data source 110. As such, query engine 314 may determine which data fields are being accessed by a query and which VDSs 120 include those data fields based on filter information 236.

Figure 4A:
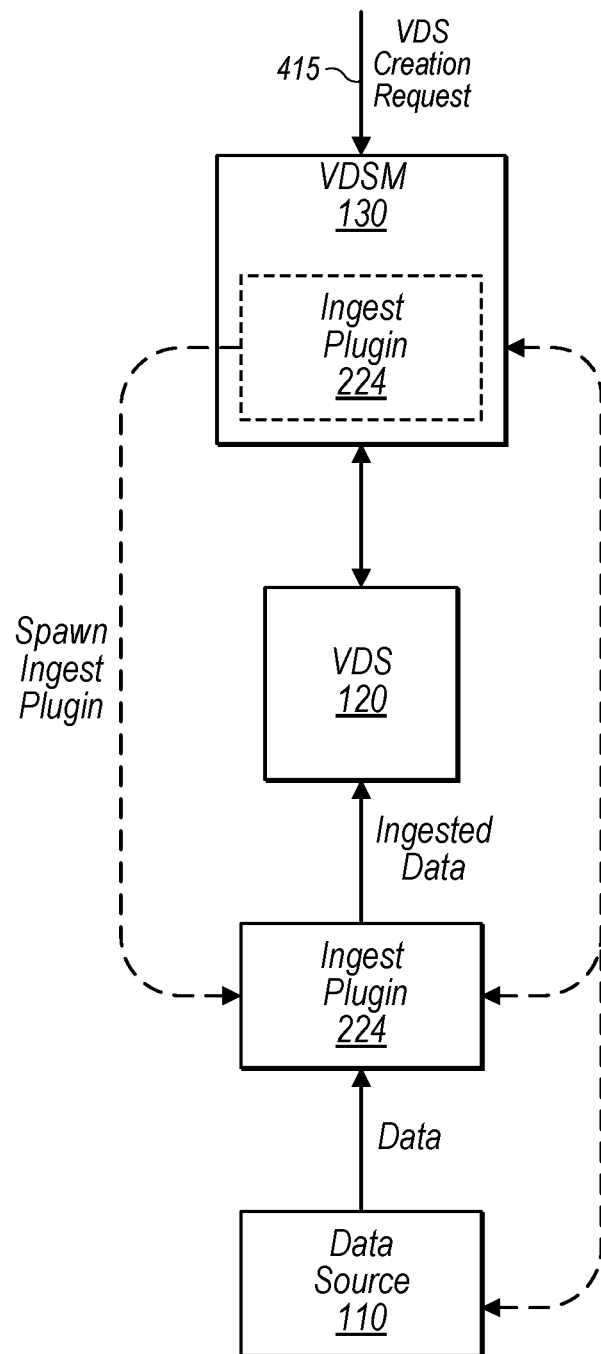
FIG. 4A is a block diagram illustrating example elements of an ingest plugin, according to some embodiments.

Turning now to FIG. 4A, a block diagram of an example ingest plugin 224 is shown. In the illustrated embodiment, VDSM 130 receives a VDS creation request 415—the request may be received from a user via VDSM API 311 or a user interface that is provided by user interface engine 312. VDS creation request 415, in various embodiments, is a request to create a VDS 120 from an origin (e.g., an underlying data source 110) or to load a previously created VDS 120 into compute cluster 140. Consequently, VDS creation request 415 may identify a location of the origin (e.g., a uniform resource location (URL)) and ingest information for selecting ingest plugin 224 from a list of ingest plugins and configuring ingest plugin 224 to ingest data from the origin. As an example, if data is being ingested from an Oracle® database, then an ingest plugin configured for Oracle® database may be selected from a list of plugins 224. That ingest plugin may be provided with the location of the underlying data source 110 (e.g., the URL), the VPN parameters if applicable, and the ingest information (e.g., source information 232, filter information 236, etc.).

To spawn ingest plugin 224, in various embodiments, resource manager 315 determines whether there are sufficient resources (e.g., servers) in the pool of resources to run ingest plugin 224. If there are sufficient resources, then resource manager 315 may allocate a set of resources for running ingest plugin 224, and ingest plugin 224 may be instantiated on those resources. If there are not sufficient resources, however, then resource manager 315 may wait to instantiate ingest plugin 224 until there are sufficient resources. As shown, ingest plugin 224 extracts data from data source 110 after being spawned by VDSM 130. When extracting data, ingest plugin 224 may extract data directly from the underlying data structure (e.g., a database table) or from a change data capture feed that identifies changes made to data source 110. Ingest plugin 224 may also look for changes to data in a data source 110 (e.g., a file system) and propagate those changes into VDS 120.

As depicted, ingest plugin 224 produces ingested data that is provided to VDS 120. In some cases, ingest plugin 224 transforms data from a first format to a second, different format that permits that data to be stored at VDS 120. Consider an example in which VDS 120 includes a bitmap index as a data representation 210 and that the underlying data is being extracted from a database table. Ingest plugin 224 may create a bit string having bits that have been set to represent values from records of the database table. The bit string may then be added to the bitmap index of VDS 120. Ingest plugin 224 may continually ingest updates to data in the data source 110 in order to keep VDS 120 updated.

In various cases, ingest plugin 224 may execute on the same network as the origin (e.g., an underlying data source 110), but that network may be a different network than the network associated with VDS 120. Consequently, ingest plugin 224 may abstract (e.g., convert the data into a bit stream/format) and compress the data that it ingests before sending that compressed ingested data to VDS 120—this may reduce the amount of network bandwidth consumed in transporting the data. In various embodiments, ingest plugin 224 can be stacked with other plugins 224 such that the output of ingest plugin 224 serves as the input of another plugin 224 (or vice versa). For example, an ingest transformation plugin 224 may convert user birthdates from a database table into age values and ingest plugin 224 may store those age values in a bit string format.

Figure 4B:
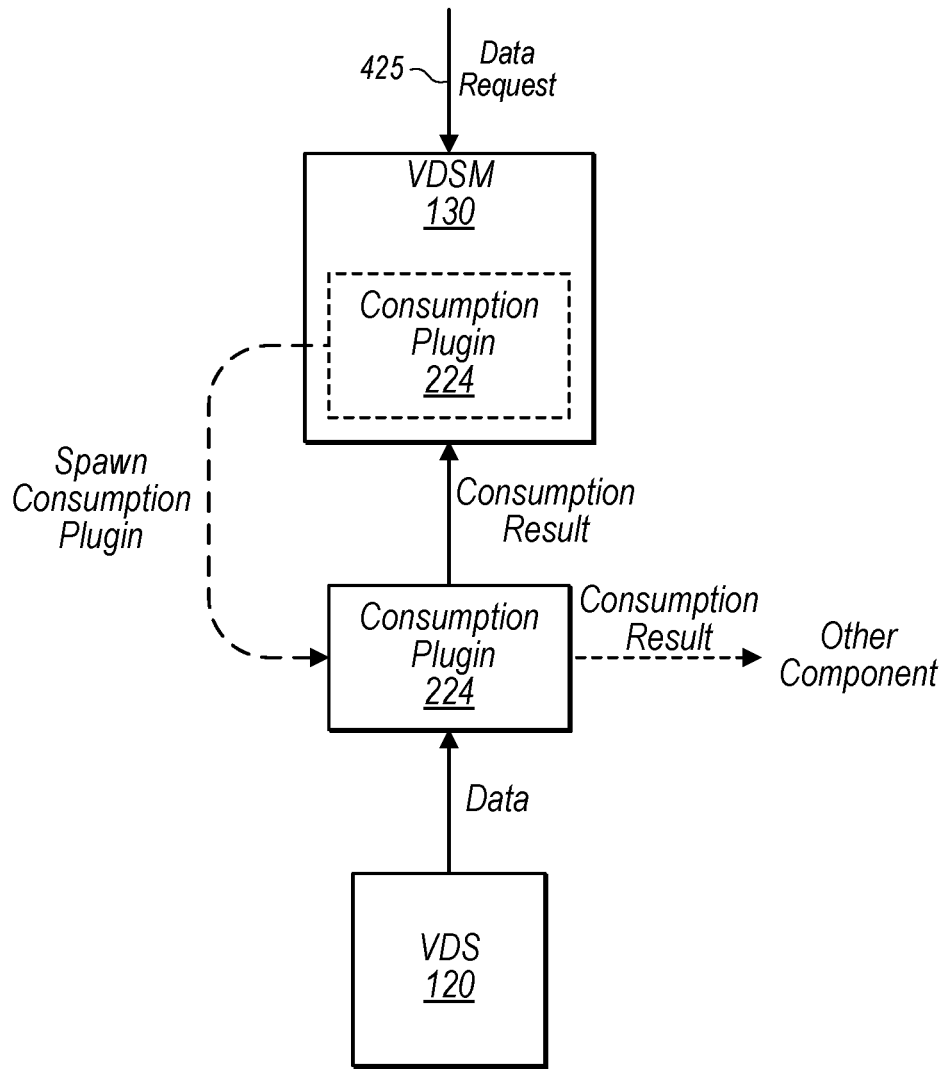
FIG. 4B is a block diagram illustrating example elements of a consumption plugin, according to some embodiments.

Turning now to FIG. 4B, a block diagram of an example consumption plugin 224 is shown. Consumption plugin 224, in various embodiments, is a set of software routines executable to perform operations on outgoing data from VDS 120. The illustrated embodiment presents an example use case of a consumption plugin 224 in which VDSM 130 receives a data request 425—the request may be received from an entity via VDSM API 311 or a user interface that is provided by user interface engine 312. Instead of spawning consumption plugin 224 in response to data request 425 as discussed below, VDSM 130 may spawn consumption plugin 224 in response to a trigger event or set intervals of time, for example.

Data request 425, in various embodiments, is a request for particular data from VDS 120. Data request 425 may specify one or more queries to execute against VDS 120 and may specify a data format in which to return the results from VDS 120 to the requestor. VDSM 130 may select, based on the format of the queries, a particular consumption plugin from a list of consumption plugins 224 that is capable of converting the one or more queries of data request 425 from, e.g., SQL into a query format understood by VDS 120 so that those queries can be executed. In some cases, consumption plugin 224 may translate API calls written for, e.g., Cassandra® or MongoDB® into a query format understood by the VDS 120 so that those calls can be carried out. VDSM 130 (or consumption plugin 224) may route the converted queries to VDS 120. In some cases, a consumption transformation plugin 224 may receive a query result from VDS 120 and convert the result into the requested data format before returning the formatted query result to VDSM 130. For example, if data is being written from VDS 120 into a relational database, then the consumption transformation plugin 224 may translate the data into the format of that relational database.

Another example of a consumption plugin 224 is a plugin that ensures that data leaving VDS 120 is compliant with specified policies. For example, VDS 120 might be deployed and executing within an EU country. As a result, a consumption plugin 224 may be instantiated that can verify that outgoing data is compliant with the General Data Protection Regulation. Another example of a consumption plugin 224 is a plugin that establishes a secure connection between the VDS environment and the destination computer system so that data is secure during transmission between VDS 120 and the destination computer system. Another example of a consumption plugin 224 is a plugin that replicates changes from one VDS 120 to another VDS 120. For example, a consumption plugin 224 may ensure that a Europe-based VDS 120 is kept up to date with a US-based counterpart VDS 120 by detecting changes to the US-based VDS 120 and propagating them to the Europe-based VDS 120.

Figure 4C:
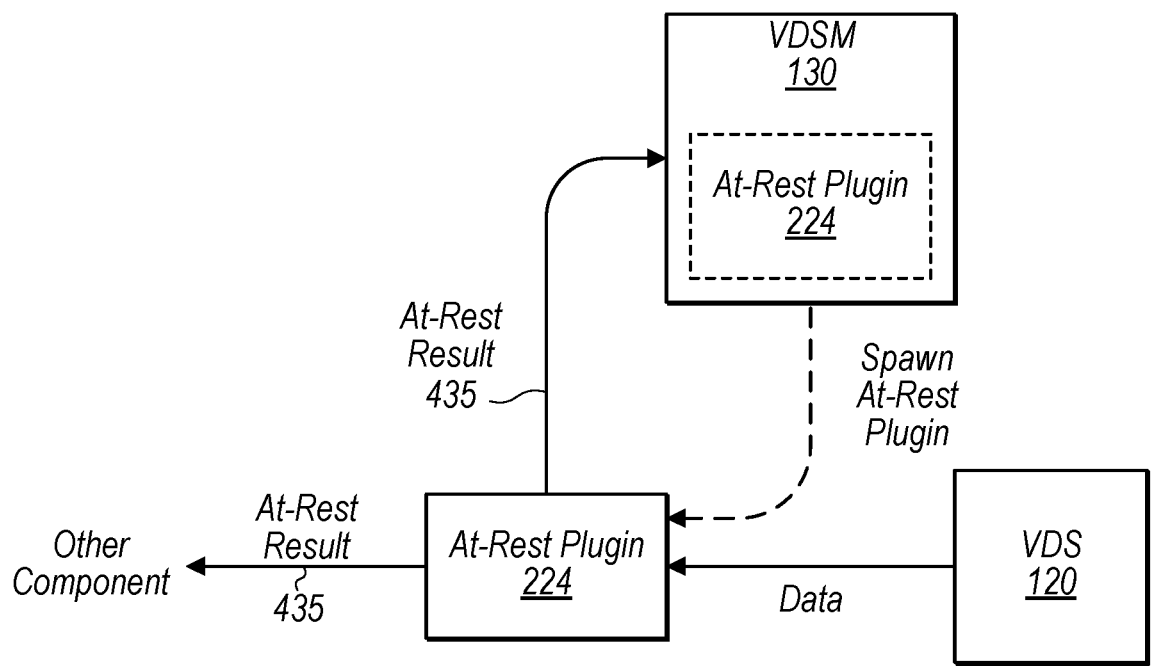
FIG. 4C is a block diagram illustrating example elements of an at-rest plugin, according to some embodiments.

Turning now to FIG. 4C, a block diagram of an example at-rest plugin 224 is shown. At-rest plugin 224, in various embodiments, is a set of software routines that are executable to perform a set of operations on data while it resides at VDS 120. In the illustrated embodiment, at-rest plugin 224 is spawned by VDSM 130. In various cases, VDSM 130 may spawn at-rest plugin 224 in response to receiving a request to perform a particular task (e.g., from a user that wants to run an analysis on the data of VDS 120); in yet other cases, VDSM 130 may spawn at-rest plugin 224 in response to a trigger event (e.g., an update to VDS 120) or at set intervals of time.

Examples of at-rest plugins 224 include a plugin that generates results from executing machine learning models based on data in VDS 120, a plugin that generates charts and graphs providing a visual representation of data in VDS 120 (e.g., a chart showing different income levels), a plugin that performs a data integrity operation in order to verify that data included in VDS 120 accurately represents data included in data source 110, etc. As shown, at-rest plugin 224 generates an at-rest result 435 that is derived from the operations that it performs on data from VDS 120. That at-rest result 435 can be sent to VDSM 130 or to another component (e.g., a user device). For example, if at-rest plugins 224 is a plugin that generates charts and graphs, then at-rest plugins 224 may send information about the charts and graphs to VDSM 130 as at-rest result 435 for generating a user interface to present the charts and graphs to a user. In some cases, at-rest result 435 may be inserted as new data into VDS 120 or used to update data already stored in VDS 120. An at-rest transformation plugin 224 may be used to transform at-rest result 435 to a particular format before it is stored in VDS 120. At-rest plugins 224 may further be used, for example, for feature engineering, calculating fields, etc.

Figure 5A:
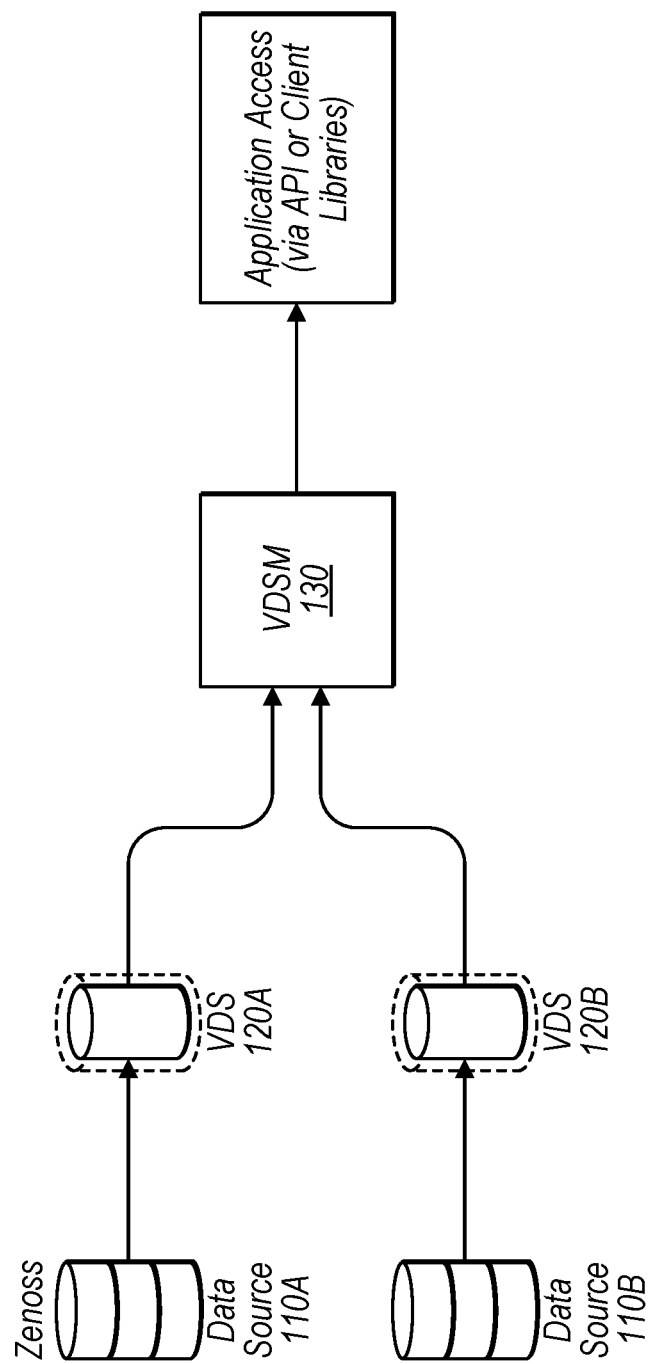
FIG. 5A is a block diagram illustrating an example implementation involving a VDSM and VDSs, according to some embodiments.

Turning now to FIG. 5A, a block diagram of an example implementation of VDSM 130 and VDSs 120 is shown. In the illustrated embodiment, the example implementation includes multiple VDSs 120 that are managed by VDSM 130. As shown, data source 110A, which is a platform provided by Zenoss®, is an origin of data for VDS 120A, and data source 110B, which may be a data lake, is an origin of data for VDS 120B. VDSM 130 may receive queries from applications (via APIs or client libraries) for data stored at the original data sources 110. Instead of executing the queries against data source 110A and 110B, VDSM 130 may execute the queries against VDSs 120A and 120B. Accordingly, VDSM 130 may receive a result from VDSs 120A and 120B and return that result to the requesting process. In various cases, due to the structural nature of VDSs, executing the queries against VDSs 120A and 120B can be performed in a shorter amount of time relative to executing the queries against data sources 110A and 110B.

Figure 5B:
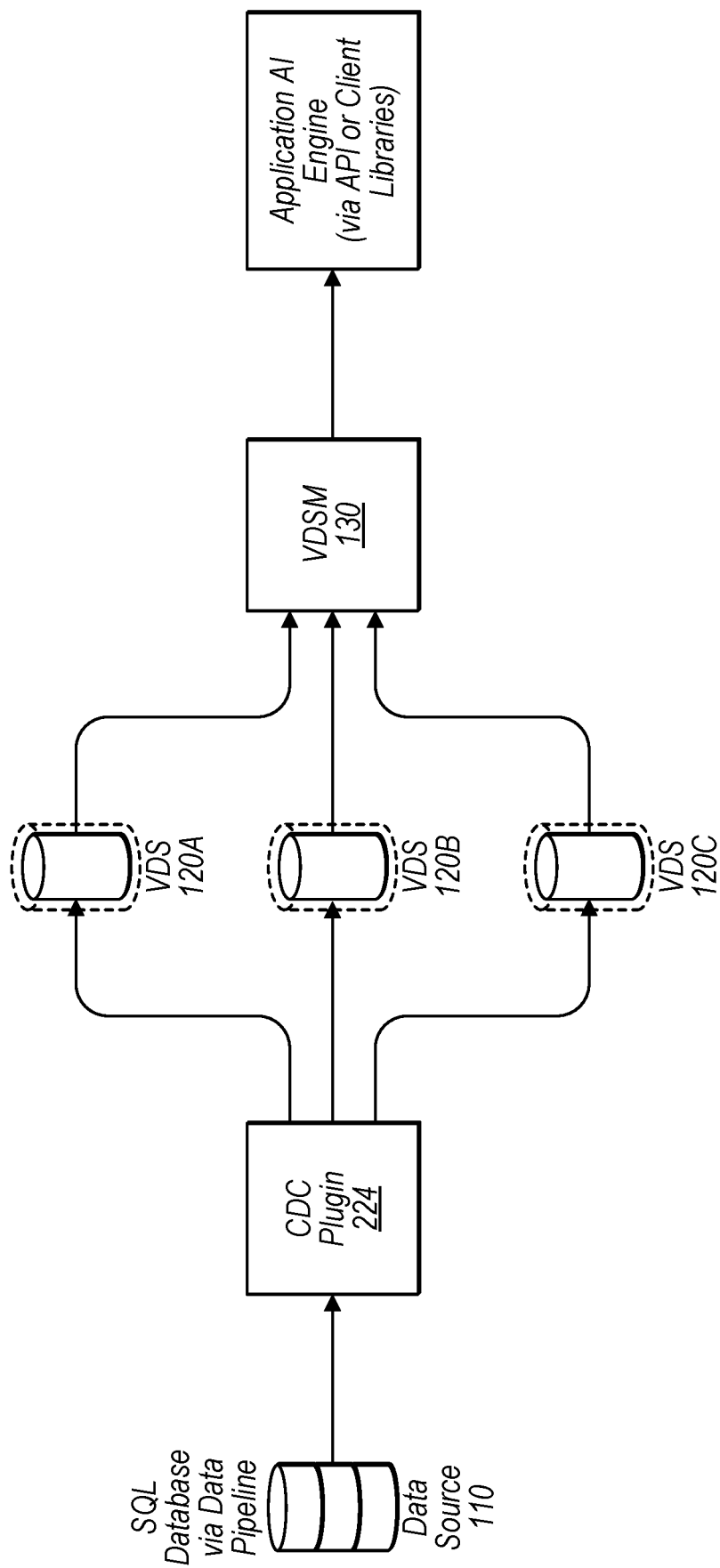
FIG. 5B is a block diagram illustrating another example implementation involving a VDSM and VDSs, according to some embodiments.

Turning now to FIG. 5B, a block diagram of another example implementation of VDSM 130 and VDSs 120 is shown. In the illustrated embodiment, VDSs 120A-C include data that is representative of data stored at data source 110, which is a SQL database in the illustrated embodiment. As shown, there is a change data capture (CDC) plugin (an example of an ingest plugin 224) that can ingest data from data source 110 and into VDS 120A-C. This may include updates received at the SQL database as part of its ingest pipeline. As further shown, VDSM 130 interfaces with an application and/or an AI engine (which may be an example of a consumption plugin 224) that issues requests for data to VDSM 130. VDSM 130 can execute queries derived from those requests against VDSs 120A-C to generate a result. VDSM 130 may then return that result to the application and/or AI engine. When implementing AI routines, in various cases, VDSs 120A-C are more suitable for the operations being performed by those AI routines than the SQL database since VDSs 120A-C may support a higher speed of iteration and if the model is embedded, adjacency in the same compute fabric.

Figure 6:
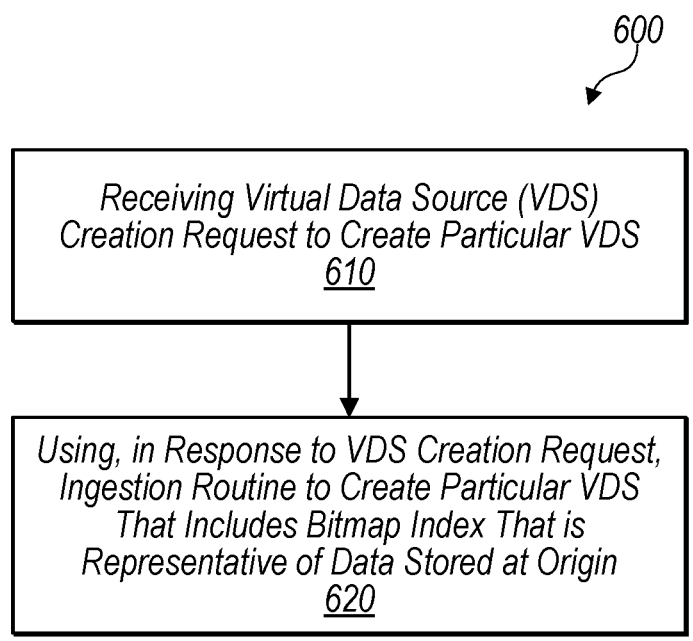
FIG. 6 is a flow diagram illustrating an example method relating to creating a VDS, according to some embodiments.

Turning now to FIG. 6, a flow diagram of a method 600 is shown. Method 600 is one embodiment of a method performed by a computer system implementing a virtual data source manager (e.g., a VDSM 130) that is capable of creating and managing virtual data sources (e.g., VDSs 120). In some cases, method 600 may be performed by executing a set of program instructions stored on a non-transitory computer-readable medium. In some embodiments, method 600 includes more or less steps than shown. For example, method 600 may include a step in which the VDSM processes a request for data included in a VDS.

Method 600 begins in step 610 with the VDSM receiving a virtual data source (VDS) creation request (e.g., a VDS creation request 415) to create a particular VDS. The VDS creation request may include information (e.g., VDS metadata 230) that is usable to identify an origin of the particular VDS and an ingestion routine (e.g., an ingest plugin 224). The information included in the VDS creation request may identify a set of data filters usable to select a subset of the data stored at the origin of the particular VDS—e.g., select data from fields "income," "name," and "hobbies" of database table "user". Accordingly, at least one of the data filters may specify a mapping from a data field of the origin of the particular VDS to a data field of the particular VDS. In some cases, a first field name may be used for the data field of the origin of the particular VDS and a second, different field name is used for the data field of the particular VDS. The information included in the VDS creation request may identify a set of data transformation usable for transforming data of the origin from a first value (e.g., a birthdate) to a second value (e.g., an age).

In step 620, in response to the VDS creation request, the VDSM uses the ingestion routine to create the particular VDS that includes a bitmap index (e.g., a data representation 210) that is representative of data stored at the origin. In response to a data request (e.g., a data request 425) that corresponds to the origin, in various embodiments, the particular VDS is usable to initiate a query to the particular VDS without accessing the origin. In some cases, the origin may be an original data source corresponding to a relational database or a non-relational database. In yet some cases, the origin is a second VDS created based on data stored at a corresponding original data source—e.g., topology 150B.

In various cases, the VDSM may receive a particular data request for data stored in a set of original data sources that correspond to a set of VDSs managed by the VDSM. The set of VDSs includes the particular VDS. Based on the particular data request, the VDSM may determine that the bitmap index included in the particular VDS corresponds to the particular data request. For example, the particular data request may request access to data from a "user" database table stored at the origin and the bitmap index included in the particular VDS may store information representative of the data stored in that "user" database table. Accordingly, the VDSM may determine that the bitmap index can be used to process the data request. The VDSM may send, to the particular VDS, one or more queries that are based on the particular data request (e.g., the data request may specify the queries) to access the requested data without accessing the origin of the particular VDS.

In some embodiments, the VDSM causes a user interface to be displayed to a user via a user device. The user interface may permit the user to invoke functions included in an API (e.g., VDSM API 311) by selecting one or more options displayed in the user interface. The one or more options may include an option to select a origin from a list of origins (e.g., data sources 110 and VDSs 120) upon which to create a VDS. Accordingly, the information that is included in VDS creation request may identify a selection by the user of the origin of the particular VDS from the list of origins. The one or more options may also include an option to select a set of software plugins from a library of software plugins (e.g., plugins 224) maintained by the VDSM. A given software plugin from the library may be executable to perform a respective set of functions (e.g., data transformation) in relation to the particular VDS. In some cases, the particular VDS may be associated with a first set of software plugins that is different than a second set of software plugins that is associated with a second particular VDS managed by the VDSM.

In some embodiments, the VDSM manages a pool of resources by allocating resources (e.g., servers, nodes 145, storage devices, etc.) of the pool to the VDS and one or more services (e.g., VDSM API 311, user interface engine 312, etc.) maintained by the computer system. The VDSM may provide an application programming interface (API) (e.g., VDSM API 311) that permits an external entity (e.g., an application server) to issue requests to the VDSM to perform one or more functions (e.g., access data) in relation to the VDS. The API may include a delete function callable to cause the VDSM to delete a VDS, a list function callable to cause the VDSM to list VDSs managed by the VDSM, and/or a clone function callable to cause the VDSM to create a VDS by cloning another VDS. The VDSM may allocate at least one resource (e.g., a server) from the pool as an API server for implementing the API. In various cases, the VDSM may allocate at least one resource (e.g., a server) from the pool to a compute cluster for implementing the VDS—the compute cluster may implement a plurality of VDSs managed by the VDSM. In some cases, the VDSs may be implemented on a set of virtual machines and the VDSM may be implemented on a different virtual machine. In various cases, the VDSM may allocate at least one resource (e.g., a server) from the pool as a web server for providing user interfaces from a user interface engine of the VDSM. In various cases, the VDSM may allocate at least one resource (e.g., a server) from the pool as an ingest server for implementing the ingestion routine to create the particular VDS.

Figure 7:
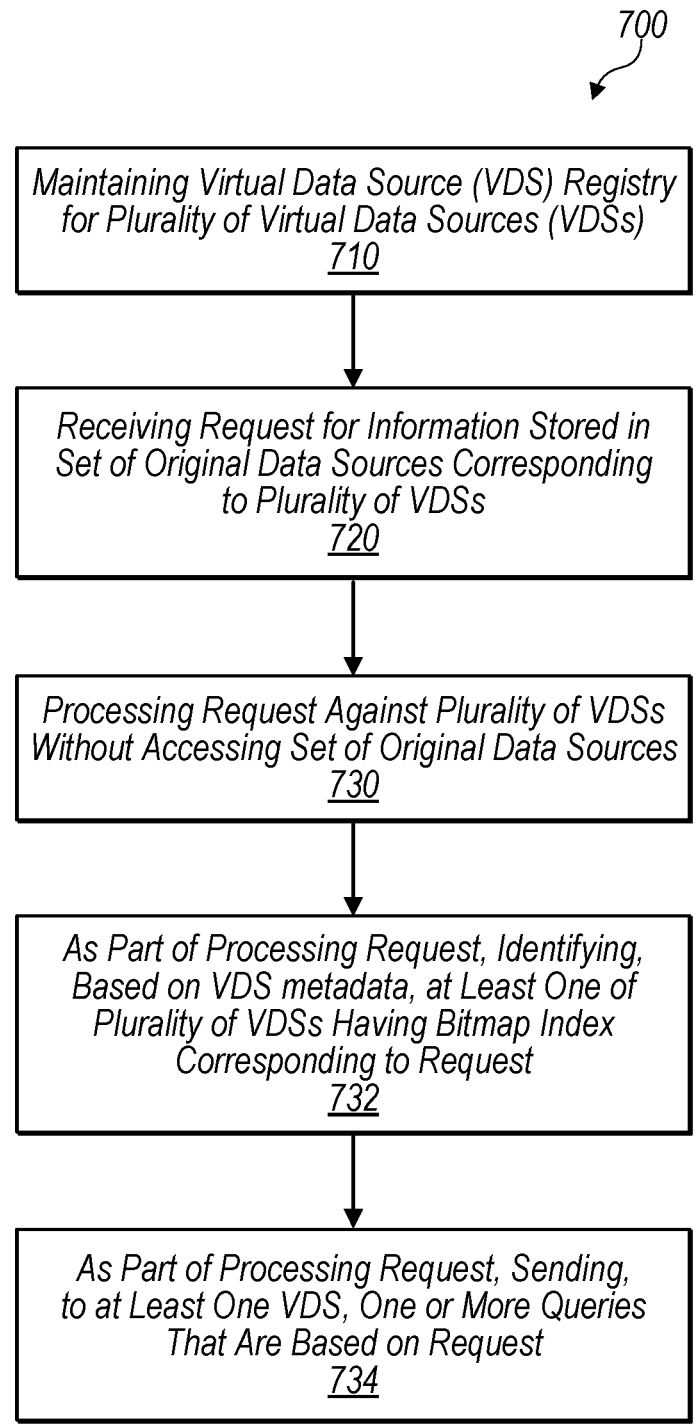
FIG. 7 is a flow diagram illustrating an example method relating to using a VDS to process a data request, according to some embodiments.

Turning now to FIG. 7, a flow diagram of a method 700 is shown. Method 700 is one embodiment of a method performed by a computer system implementing a virtual data source manager (e.g., a VDSM 130) that is capable of using virtual data sources (e.g., VDSs 120) to process data requests (e.g., data requests 425). Method 700 may be performed by executing a set of program instructions stored on a non-transitory computer-readable medium. In some embodiments, method 700 includes more or less steps than shown. For example, method 700 may include a step in which the VDSM creates a VDS.

Method 700 begins in step 710 with the VDSM maintaining a virtual data source (VDS) registry (e.g., a VDS registry 320) for a plurality of virtual data sources (VDSs). The VDS registry may include, for a given one of the plurality of VDSs, VDS metadata (e.g., VDS metadata 230) that is indicative of data represented in a bitmap index (e.g., a data representation 210) included in that given VDS. In step 720, the VDSM receives a request for information (e.g., data request 425) stored in a set of original data sources (e.g., data sources 110) that correspond to the plurality of VDSs.

In step 730, the VDSM processes the request against the plurality of VDSs without accessing the set of original data sources. In step 732, as part of the processing, the VDSM identifies, based on the VDS metadata, at least one of the plurality of VDSs having a bitmap index corresponding to the request (e.g., the VDS metadata indicates that its corresponding bitmap index stores information for a data field from which data is being requested). In step 734, as part of the processing, the VDSM sends, to the at least one VDS, one or more queries that are based on the request. Prior to sending the one or more queries, the VDSM may cause execution of a consumption routine (e.g., a plugin 224) to convert the one or more queries from a first format corresponding to the set of original data sources to a second, different format corresponding to the at least one VDS. In some cases, the VDSM may determine, whether an issuer of the request for information is included in a list of issuers permitted to access information from the at least one VDS. In some cases, the VDSM may aggregate information returned by at least two different VDSs for the one or more queries to generate a result and return the result to the issuer of the request for information.

In various cases, the VDSM may receive a VDS creation request to create a particular VDS. The VDSM may use, in response to the VDS creation request, an ingestion routine to create the particular VDS to include a bitmap index that is representative of data stored at an origin. The VDSM may update the VDS registry to include VDS metadata for that particular VDS.

Turning now to FIG. 8, a flow diagram of a method 800 is shown. Method 800 is one embodiment of a method performed by a computer system to create a VDS (e.g., a VDS 120). Method 800 may be performed by executing a set of program instructions stored on a non-transitory computer-readable medium. In some embodiments, method 800 may include more or less steps than shown. For example, method 800 may include a step in which the created VDS is used to process a data request (e.g., a data request 425).

Method 800 begins in step 810 with the computer system creating a virtual data source (VDS) based on a corresponding origin (e.g., a data source 110). The VDS may include a bitmap index (e.g., a data representation 210) that is representative of data stored at the origin and ingestion metadata (e.g., VDS metadata 230) that specifies a location of the origin and a set of ingest parameters for configuring an ingestion routine (e.g., an ingest plugin 224) to ingest data from the origin into the bitmap index.

In some cases, the origin may be an original data source that corresponds to a storage service of a cloud-based platform on a wide area network. The location may correspond to one or more files maintained by the storage service. Accordingly, the set of ingest parameters may specify: access credentials that permit the ingestion routine to access the one or more files; and at least one data format (e.g., JSON) of data objects included in the one or more files to enable the ingestion routine to parse ones of the data objects. In yet some cases, the origin may be an original data source that corresponds to a pipeline of a pipeline-based platform (e.g., Kafka® platform) that provides a data stream. As such, the set of ingest parameters may specify: a host address corresponding to the pipeline-based platform; a pipeline identifier that indicates the pipeline; and at least one data format of a set of data objects in the pipeline that enables the ingestion routine to parse ones of the set of data objects.

In some cases, the set of ingest parameters may specify a storage location at which to store data ingested from the origin for inclusion in the bitmap index The storage location may corresponds to a data store of a storage service that is provided by a cloud-based platform on a wide area network. In various cases, the computer system may store data ingested from the origin for inclusion in the bitmap index at a data store that is included in a compute cluster (e.g., compute cluster 140) that implements the VDS. The compute cluster may be managed by the computer system (e.g., managed by VDSM 130 executing on the computer system). The set of ingest parameters may specify: a mapping of a set of data fields of one or more data objects of the origin to a set of data fields of the bitmap index of the VDS. The set of data fields of the one or more data objects that is defined in the mapping is a subset of all data fields of the one or more data objects—e.g., the one or more data objects may include four data fields but only two are mapped to the bitmap index. The one or more data objects may include at least one database table. The VDS may be created such that the VDS includes an access list that identifies sets of entities and respective sets of data that can be accessed from the bitmap index by ones of those sets of entities.

The VDS may be associated with a VDS identifier that enables the computer system to identify the VDS separately from other VDSs that are managed by the computer system. In some cases, the VDS may include fingerprint information (e.g., fingerprint information 235) indicative of the VDS and the fingerprint information may specify a number of rows of the bitmap index, a number of columns of the bitmap index, and a data density of the bitmap index.

Figure 9:
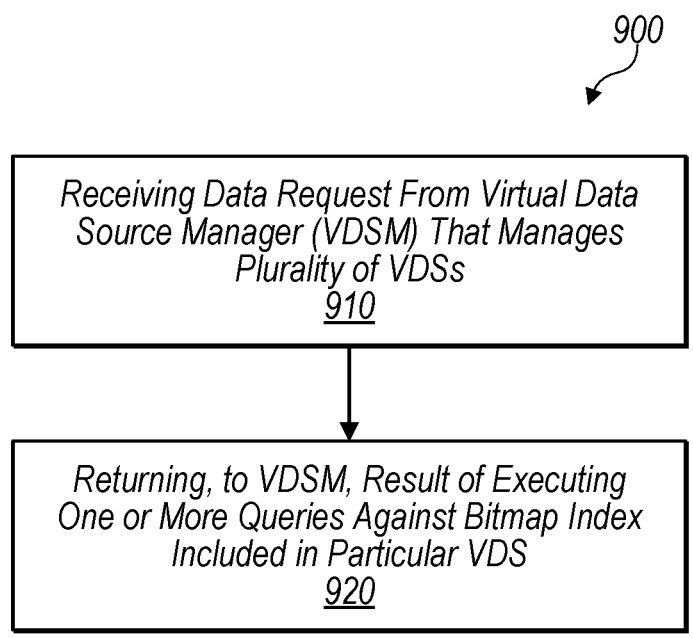
FIG. 9 is a flow diagram illustrating an example method relating to a VDS processing a data request, according to some embodiments.

Turning now to FIG. 9, a flow diagram of a method 900 is shown. Method 900 is one embodiment of a method performed by a VDS (e.g., a VDS 120) executing on a computer system to process a data request (e.g., a data request 425). Method 900 may be performed by executing a set of program instructions stored on a non-transitory computer-readable medium. In some embodiments, method 900 may include more or less steps than shown. For example, method 900 may include a step in which the VDS is created.

Method 900 begins in step 910 with the VDS receiving a data request from a virtual data source manager (VDSM) (e.g., VDSM 130) that manages a plurality of VDSs. The data request may identify one or more queries to be executed against a bitmap index (e.g., a data representation 210) that is representative of data stored in an origin (e.g., a data source 110) of the VDS. The VDS may include a plurality of portions distributed across nodes of a compute cluster (e.g., VDS 120A distributed across nodes 145A-C). In various embodiments, the data request is received by a particular portion of the plurality of portions that is executing on a node of the compute cluster (e.g., the portion of VDS 120A executing on node 145A). The particular portion of the VDS may determine ones of the nodes that are executing other ones of the plurality of portions of the VDS (e.g., nodes 145B and 145C). The particular portion may route the one or more queries to those nodes determined to be executing the other portions of the VDS. The VDS may include ingestion metadata (e.g., VDS metadata 230) specifies a location of the origin and a set of ingest parameters for configuring an ingestion routine to ingest data from the origin into the bitmap index. The origin may be a second VDS created based on a corresponding original data source.

In step 920, the VDS returns, to the VDSM, a result of executing the one or more queries against the bitmap index included in the VDS. In some cases, the particular portion of the VDS may receive a set of query results from the other portions of the VDS and may aggregate the set of query results into the result returned to the VDSM.

Figure 10:
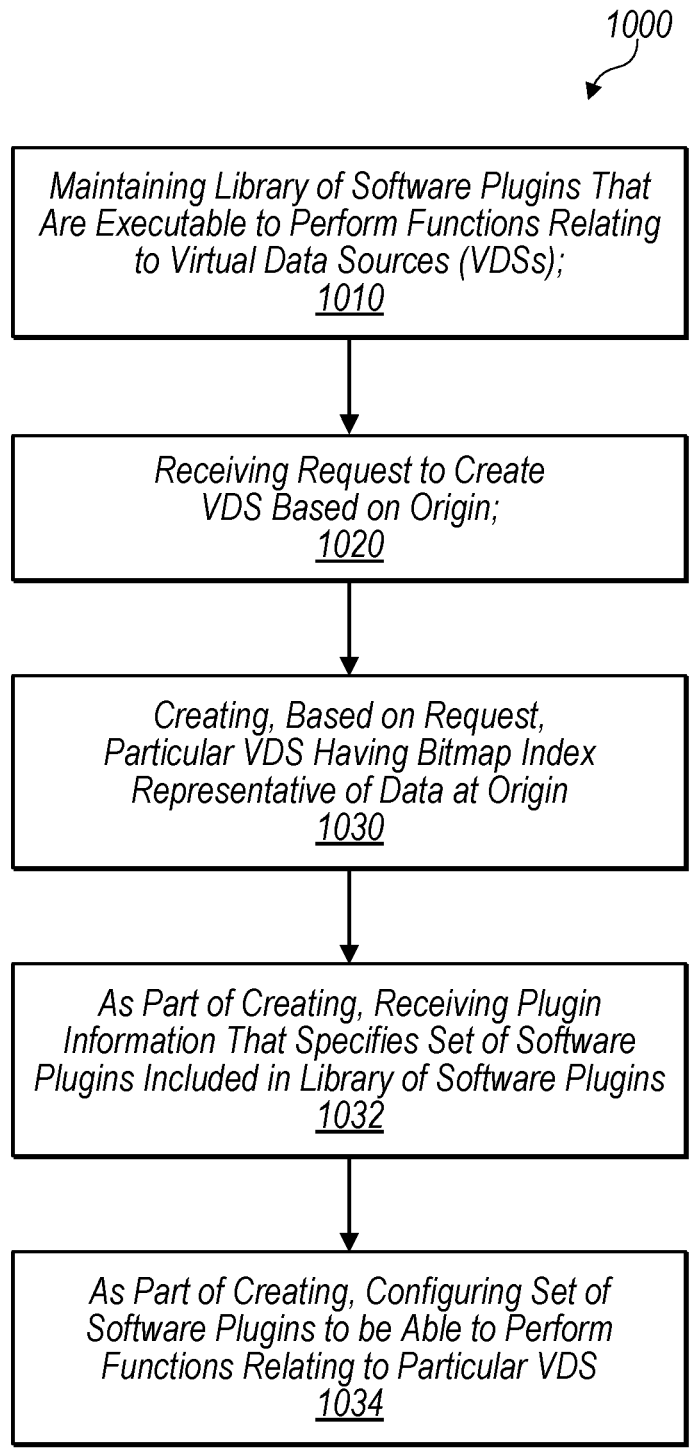
FIG. 10 is a flow diagram illustrating an example method relating to creating a VDS in association with software plugins, according to some embodiments.

Turning now to FIG. 10, a flow diagram of a method 1000 is shown. Method 1000 is one embodiment of a method performed by a VDSM (e.g., a VDSM 130) that is executing on a computer system to create a VDS (e.g., a VDS 120) with plugin support. Method 1000 may be performed by executing a set of program instructions stored on a non-transitory computer-readable medium. In some embodiments, method 1000 may include more or less steps than shown. For example, method 1000 may include a step in which the VDS used to process a data request (e.g., a data request 425).

Method 1000 begins in step 1010 with the VDSM maintaining a library of software plugins (e.g., plugins 224) that are executable to perform functions (e.g., ingest data from a data source 110 into a data representation 210 included in a VDS 120) relating to virtual data sources (VDSs). In step 1020, the VDSM receives a request (e.g., a VDS creation request 415) to create a VDS based on an origin (e.g., a data source 110).

In step 1030, the VDSM creates, based on the request, a particular VDS having a bitmap index (e.g., a data representation 210) representative of data at the origin. In step 1032, as part of the creating, the VDSM receives plugin information that specifies a set of software plugins included in the library of software plugins. In some cases, the VDSM may cause an interface (e.g., an interface generated by user interface engine 312) to be displayed to a user via a user device. The interface may present software plugins from the library of software plugins and the user may select a set of the software plugins to be associated with the VDS, resulting in the VDSM receiving the plugin information. In step 1034, as part of the creating, the VDSM configures the set of software plugins to be able to perform functions relating to the particular VDS. Configuring a plugin may include, for example, allocating resources (e.g., processors and memory) to execute the plugin, instantiating the plugin using those resources, configuring network ports to permit the plugin to communicate with a VDS, and/or providing storage to the plugin for storing results from its execution.

In some cases, the VDSM may receive a request (e.g., a data request 425) for data included in the bitmap index. The request for data may specify one or more queries (e.g., SQL queries) in a first format. The VDSM may spawn a consumption software plugin from the set of software plugins to process the request for data, including by translating the one or more queries from the first format to a second, different format (e.g., a VDS query language) that can be processed against the bitmap index.

In some embodiments, the set of software plugins include an ingest software plugin that is capable of accessing data of the origin and converting that data from a first format (e.g., data records of a database table) used at the origin to a second, different format (e.g., bit strings for a bitmap index) that permits that data to be stored in the bitmap index. The ingest software plugin may be capable of accessing data of the origin by ingesting data from a change data capture feed that identifies data changes to the origin. In some cases, the ingest software plugin may be capable of accessing data of the origin by identifying data changes in a file system of the origin and propagating the data changes into the bitmap index. The set of software plugins may include a second ingest software plugin that is capable of ingesting ingested data into the bitmap index that is produced by the first ingest software plugin—plugins 224 may be stacked such that the output of one plugin 224 is the input of another plugin 224. In some cases, the origin is located externally to the particular VDS (e.g., the origin is a cloud platform operated by a third party). The VDSM may cause the ingest software plugin to be executed on a computer system of a local-area network that includes the origin (e.g., executed on the cloud platform). The ingest software plugin may compress data ingested from the origin before sending that ingested data from the local-area network that includes the origin (e.g., the cloud platform) to a different local-area network that includes the particular VDS (e.g., another cloud platform). In some cases, the set of software plugins may include a transformation software plugin that is capable of performing a set of transformations on values of one or more data fields of the origin to generate values for a particular data field of the bitmap index that is not included in the data at the origin.

Figure 11:
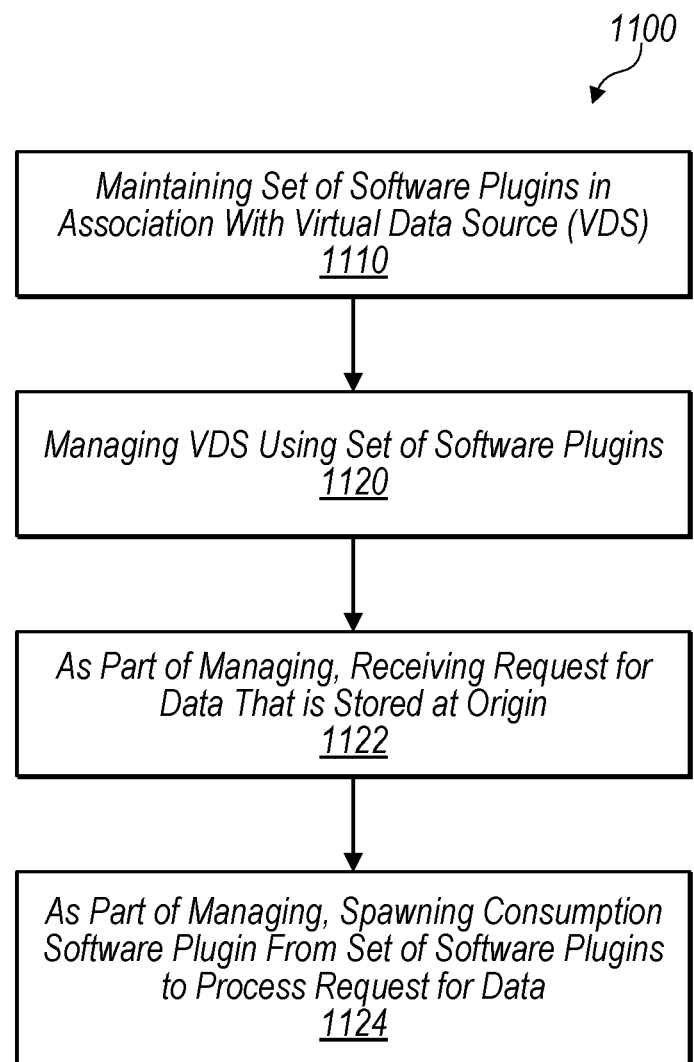
FIG. 11 is a flow diagram illustrating an example method relating to managing a VDS using software plugins, according to some embodiments.

Turning now to FIG. 11, a flow diagram of a method 1100 is shown. Method 1100 is one embodiment of a method performed by a VDSM (e.g., a VDSM 130) that is executing on a computer system to manage a VDS (e.g., a VDS 120) using a set of software plugins (e.g., plugins 224). Method 1100 may be performed by executing a set of program instructions stored on a non-transitory computer-readable medium. In some embodiments, method 1100 may include more or less steps than shown. For example, method 1100 may include a step in which the VDS used to process a data request (e.g., a data request 425).

Method 1100 begins in step 1110 with the VDSM maintaining a set of software plugins in association with a virtual data source (VDS). Ones of the set of software plugins may be executable to perform corresponding functions (e.g., access prevention, monitoring, data transformation, data encryption, etc.) in relation to the VDS. In some cases, a second VDS managed by the VDSM may be associated with a second set of software plugins that is different than the set of software plugins associated with the VDS. In some cases, the VDS may be created based on a second origin. The origin and the second origin may be different types of data sources. For example, the origin may be another VDS and the second origin may be an original data source that corresponds to a relational database.

In step 1120, the VDSM manages the VDS using the set of software plugins. In step 1122, as part of the managing, the VDSM receives a request (e.g., a data request 425) for data that is stored at an origin (e.g., a data source 110). The VDS may include a bitmap index (e.g., a data representation 210) representative of the data stored at the origin. In step 1124, as part of the managing, the VDSM spawns a consumption software plugin from the set of software plugins to process the request for data. The consumption software plugin may translate one or more queries included in the request from a first format to a second, different format that can be processed against the bitmap index of the VDS.

In some cases, the set of software plugins may include a second consumption software plugin that may perform a data integrity operation to verify that data included in the bitmap index is representative of data included in the origin. In some cases, the set of software plugins may include a second consumption software plugin that is capable of executing one or more machine learning models against data included in the bitmap index. In some cases, the set of software plugins may include a security software plugin that is capable of establishing a secure connection for sending data from the VDS to an endpoint system. In some cases, the set of software plugins may include a security software plugin that is capable of preventing accesses of data included in the bitmap index are not compliant with a specified set of security policies. In some cases, the set of software plugins may include a monitoring software plugin that is capable of collecting a set of metrics pertaining to an operation of the VDS. In some cases, the set of software plugins may include a consumption software plugin that is capable of operating on data being sent from the VDS to a destination entity. The destination entity may be another particular VDS that is located in a different geographic region than the particular VDS. The consumption software plugin may be capable of detecting changes to the VDS and propagating the changes to the other VDS.

Figure 12:
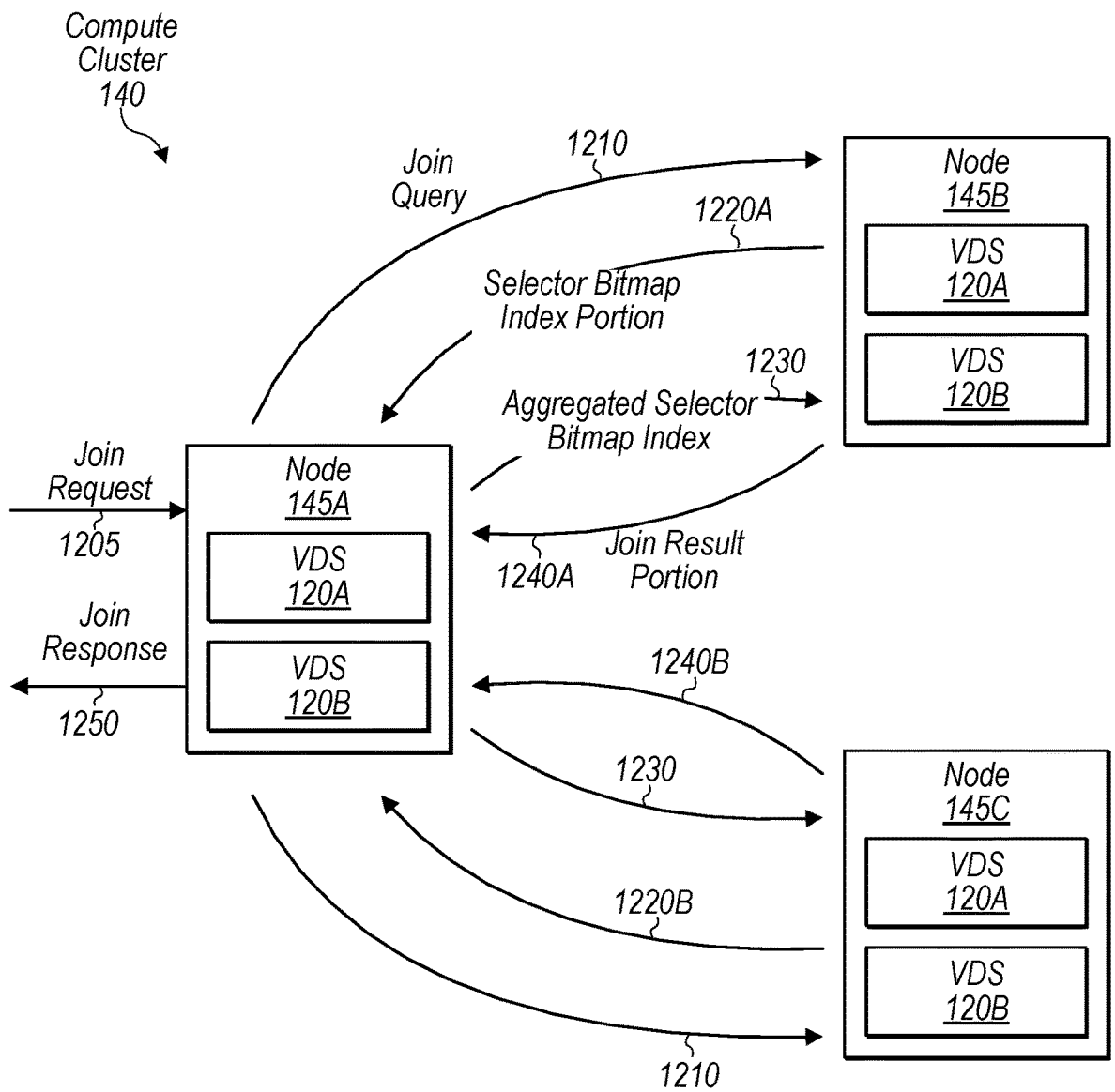
FIG. 12 is a block diagram illustrating nodes performing a join operation, according to some embodiments.

Turning now to FIG. 12, a block diagram of nodes 145A-C performing a join operation is depicted. In the illustrated embodiments, nodes 145A-C include VDSs 120A and 120B. As previously discussed, a VDS 120 includes a data representation 210 that may be sharded across multiple nodes 145. Accordingly, the data representations 210 of VDSs 120A and 120B may be sharded across nodes 145A-C. For example, VDS 120A may include a bitmap index that is sharded such that each node 145 includes a portion of the bitmap index. In some embodiments, nodes 145A-C include a complete version of the data representations 210 of VDSs 120A and 120B. The illustrated embodiment may be implemented differently than shown. For example, there may be more or less nodes 145 and each node 145 might include one or more VDSs 120 that are not sharded.

In many cases, it may be desirable to access data from multiple datasets (e.g., access data about users, purchases, and products). Those datasets, however, may be stored in different bitmap indexes and even different VDSs 120. Thus, it may be desirable to provide a mechanism for joining data from different bitmap indexes into a join result that is returned to a requestor of that data. Accordingly, various techniques are discussed for executing join operations to join data from multiple bitmap indexes that may be included in multiple VDSs 120.

As discussed below, in various embodiments, performing a join operation (e.g., one-to-one inner join) involves the cooperation of multiple nodes 145 that each perform a series of operations on their portion of a set of bitmap indexes. As nodes 145 carry out those operations, they may generate intermediate results that are aggregated by a leader node 145 that serves as an orchestrator for the join operation. The aggregated intermediate results (or a portion thereof) may be distributed back to the nodes 145 by the leader node 145 to enable them to perform the remaining operations to produce join query results that are returned to the leader node 145 for aggregation. The aggregated join query results may then be provided to the initiator of the join query 1210 as a complete response. While a join operation that involves multiple VDSs 120 is discussed below, in some cases, a join operation might involve a single VDS 120 that includes multiple bitmap indexes.

As shown, node 145A receives a join request 1205 for data included in multiple VDSs 120 (e.g., VDS 120A and 120B). In various embodiments, a join request 1205 is received from VDSM 130 and specifies a join query 1210 derived from a data request 425 received at VDSM 130. For example, VDSM 130 may receive a data request that specifies a SQL query for joining data from two separate data entities (e.g., tables). In preparation to perform the join operation, the SQL query may be translated by query engine 314 to a query language understood by VDSs 120, such as the PILOSA Query Language. The translated query is then included in a join request 1205 as a join query 1210. In various embodiments, a join request 1205 is sent by VDSM 130 to one of the nodes 145 that is selected as a leader of the group. In some cases, the leader node 145 may be randomly selected (e.g., by VDSM 130) while, in other cases, the leader node 145 may be selected based on a consideration of the individual workloads of the nodes 145A-C. In the illustrated embodiment, node 145A is selected as the leader node 145 and thus receives the illustrated join request 1205. While the illustrated embodiment depicts node 145A receiving a join request 1205, the join request 1205 may instead be sent to node 145B or 145C. In some embodiments, VDSM 130 provides a join request 1205 to each node 145 involved in the join operation.

In response to receiving a join request 1205, in various embodiments, the leader node 145 disperses the join query 1210 included in the join request 1205 to those nodes 145 having VDSs 120 associated with the requested join operation. For example, node 145A may receive a join query 1210 that is directed to VDSs 120A and 120B and thus may disperse the join query 1210 to nodes 145B and 145C. In various embodiments, the leader node 145 stores, as part of VDS metadata 230, information that describes the layout of a corresponding VDS 120 on nodes 145 (e.g., which nodes 145 include at least a portion of that corresponding VDS 120). Based on that information, the leader node 145 may determine which nodes 145 should receive a join query 1210 that is directed to a particular set of VDSs 120 based on those nodes 145 storing a portion of those VDSs 120.

After receiving a join query 1210, a node 145 may perform an initial set of operations to generate a selector bitmap index portion 1220 as part of a join operation. A selector bitmap index portion 1220, in various embodiments, is a portion of a bitmap index that is created based on a first VDS 120 and can be used to select information from a second VDS 120. In particular, when joining information stored by two or more bitmap indexes, a "linking" bitmap index may be used that shares at least one common property with each of those bitmap indexes. In various embodiments, a node 145 identifies entries of a first bitmap index (e.g., a bitmap index of VDS 120A) that 1) are associated with the common property between the first bitmap index and the linking bitmap index and 2) satisfy certain criteria that are specified in the received join query 1210. The identified entries may then be used to select entries of the linking bitmap index that are associated with the common property between a second bitmap index (e.g., a bitmap index of VDS 120B) and the linking bitmap index. Based on the selected entries, the node 145 derives a selector bitmap index portion 1220. In some embodiments, the selector bitmap index portion 1220 is provided to the leader node 145 to generate an aggregated selector bitmap index 1230. As depicted, node 145B returns a selector bitmap index portion 1220A to node 145A and node 145C returns a selector bitmap index portion 1220B to node 145. Node 145A may also create a selector bitmap index portion 1220. An example of generating a selector bitmap index portion 1220 is discussed with respect to FIG. 13A.

After receiving a set of selector bitmap index portions 1220 from a corresponding set of nodes 145, in various embodiments, the leader node 145 aggregates those portions 1220 into an aggregated selector bitmap index 1230. In many cases, VDSs 120 are distributed amongst a set of nodes 145 in such a way that certain corresponding pieces of information that are being joined are not found on the same node 145. As a result, the selector bitmap index portion 1220 generated by a first node 145 may be usable to select information from a portion of a second VDS 120 that is located on a second node 145. In some cases, the selector bitmap index portion 1220 may be usable to also select information from a portion of the second VDS 120 that is located on the first node 145; thus, the selector bitmap index portion 1220 may be usable to select information stored at multiple nodes 145. Consequently, in various embodiments, nodes 145 each provide their created selector bitmap index portion 1220 to the leader node 145, which may aggregate them into an aggregated selector bitmap index 1230. The leader node 145 may then return the aggregated selector bitmap index 1230 to the appropriate nodes 145. In some cases, the leader node 145 may split the aggregated selector bitmap index 1230 into portions and distribute those portions to their corresponding nodes 145. An example of generating an aggregated selector bitmap index 1230 is discussed with respect to FIG. 13B.

After receiving an aggregated selector bitmap index 1230 (or a portion thereof), a node 145 may perform another set of operations to generate a join result portion 1240 as part of the join operation. In various embodiments, the node 145 performs an intersect operation with the aggregated selector bitmap index 1230 and a second bitmap index (e.g., a bitmap index of VDS 120B) to identify entries of the second bitmap index to be returned for the join operation. The node 145 may then generate a join result portion 1240 that includes the identified entries of the first bitmap index (discussed earlier) and the identified entries of the second bitmap index. As shown, node 145B returns a join result portion 1240A to the leader node 145A and node 145C returns a join result portion 1240B. In response to receiving a set of join result portions 1240 from a set of nodes 145, in various embodiments, the leader node 145 aggregates those portions 1220 into an aggregated join result that is returned to the initiator (e.g., VDSM 130) in a join response 1250. In many cases, a given joined record that is included in the join result is created by the leader node 145 based on a portion of information returned from a first bitmap index of a first node 145 (e.g., a bitmap index of VDS 120A on node 145B) and a portion of information returned from a second bitmap index of a second node 145 (e.g., a bitmap index of VDS 120B on node 145C). An example of generating a join result portion 1240 and an aggregated join result is discussed with respect to FIG. 13C. These discussed techniques may be advantageous as they provide a mechanism for joining data from different bitmap indexes into a join result that is returned to a requestor of that data. By permitting data to be joined from multiple bitmap indexes, more complex analytical operations may be performed that consider the relationships between different datasets.

In some embodiments, in order to facilitate join operations in a different manner than discussed above, a bitmap index included in a VDS 120 may be created to include the data that a user intends to join. For example, a data source 110 may include two separate database tables from which data is often fetched and joined into a result returned to an initiator. Accordingly, an admin being aware that data is often joined from those database tables may create a bitmap index that incorporates data from both of those database tables. As a result, performing a join operation may involve executing a query against only the single bitmap index instead of against multiple bitmap indexes.

Figure 13A:
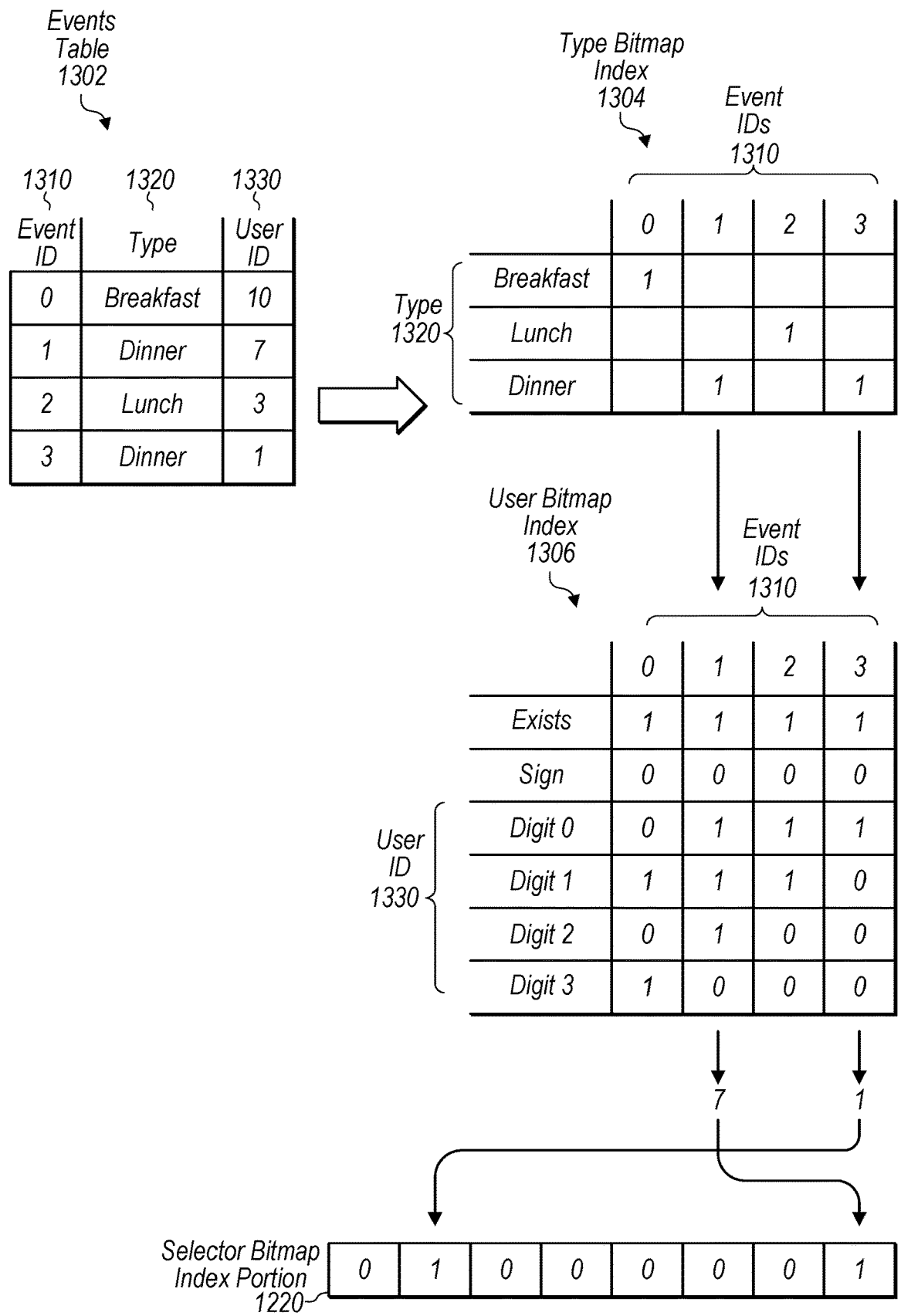
FIGS. 13A-C are block diagrams illustrating an example join operation that involves bitmap indexes, according to some embodiments.

Turning now to FIG. 13A, a block diagram illustrating example elements of an example process for creating a selector bitmap index portion 1220. An example join operation involving bitmap indexes derived from an events table and a user table is discussed with respect to FIGS. 13A-C in order to provide a deeper understanding of join operations using VDS(s) 120. While an events table and a user table are used in the discussed example, bitmap indexes derived from other data objects may be used in join operations. For example, data may be joined from bitmap indexes derived from an orders table and an accounts table.

In the illustrated embodiment, there is an events table 1302, a type bitmap index 1304, and a user bitmap index 1306. As illustrated, events table 1302 corresponds to a database table that can be found in a traditional SQL database. Type bitmap index 1304 and user bitmap index 1306 are bitmap indexes that can be derived from events table 1302. Type bitmap index 1304 corresponds to the type column of events table 1302 while user bitmap index 1306 corresponds to the user ID column. In various embodiments, type bitmap index 1304 and user bitmap index 1306 are included in a single VDS 120 while, in some embodiments, they are included in two separate VDSs 120. The VDS(s) 120 may be sharded across multiple nodes 145 such that each node 145 includes a portion of those bitmap indexes. For example, node 145B may include the first two columns of type bitmap index 1304 while node 145C includes the last two columns of type bitmap index 1304.

Consider an example in which a node 145 receives a join query 1210 to return data for those users that attended a "dinner" event and are a male. For this example, processing such a join query 1210 involves joining information from type bitmap index 1304 and a gender bitmap index (presented in FIG. 13C). As mentioned, joining information stored by two or more bitmap indexes involves the use of a linking bitmap index, in various embodiments. For this example, user bitmap index 1306 serves as a linking bitmap index as it shares a common property with type bitmap index 1304 (namely, event IDs 1310) and also a common property with the gender bitmap index (namely, user IDs 1130). Thus, user bitmap index 1306 provides a link between event IDs 1310 and user IDs 1330 (event IDs→user IDs), allowing for types 1320 to be linked with genders (types→genders). In particular, type bitmap index 1304 links types 1320 to event IDs 1310 (types→event IDs), user bitmap index 1306 links event IDs 1310 and user IDs 1330 (event IDs→user IDs), and lastly the gender bitmap index links user IDs 1330 to a gender (user IDs→genders).

As previously mentioned, when performing a join operation, a node 145 may perform an initial set of join operations to generate a selector bitmap index portion 1220. The node 145, in various embodiments, initially identifies a portion of the first bitmap index that satisfies the set of criteria specified in the join query 1210. Accordingly, for the example, a node 145 may identify which event IDs 1310 of type bitmap index 1304 have a type 1320 "dinner." As shown, event IDs 1310 "1" and "3" have a type 1320 "dinner." Based on identified portion of the first bitmap index, in various embodiments, a node 145 identifies one or more entries (or columns) of the linking bitmap index. For the example, a node 145 identifies entries "1" and "3" of user bitmap index 1306 that correspond to event IDs 1310 "1" and "3." Consequently, based on the identified entries of the linking bitmap index, in various embodiments, a node 145 generates a selector bitmap index portion 1220.

As depicted, two bits of the illustrated selector bitmap index portion 1220 are set based on the values indicated by the identified entries of user bitmap index 1306. User bitmap index 1306, in various embodiments, stores user IDs 1330 in a series of rows; each row corresponds to a bit position in a series of bits that define the numerical value of a user ID 1330. As shown, entry/column "1" of user bitmap index 1306 stores "0111" (note that digit 0 corresponds to the farthest right position of a binary value) and an indication that the user ID 1330 is valid/exists. Accordingly, the $7^{th}$ position (counting from 0, which is the farthest left position) of the selector bitmap index portion 1220 is set based on binary value "0111" corresponding to decimal value "7." In a similar manner, the $1^{st}$ position (counting from 0) is set based on entry/column "3" of user bitmap index 1306 storing "0001." After a selector bitmap index portion 1220 is created, in various embodiments, a node 145 sends the selector bitmap index portion 1220 to the leader node 145 for aggregation. In some embodiments, a node 145 performs a join operation without the cooperation of other nodes 145 and thus may generate an entire selector bitmap index and not have to communicate with a leader node 145 for aggregation.

Figure 13B:
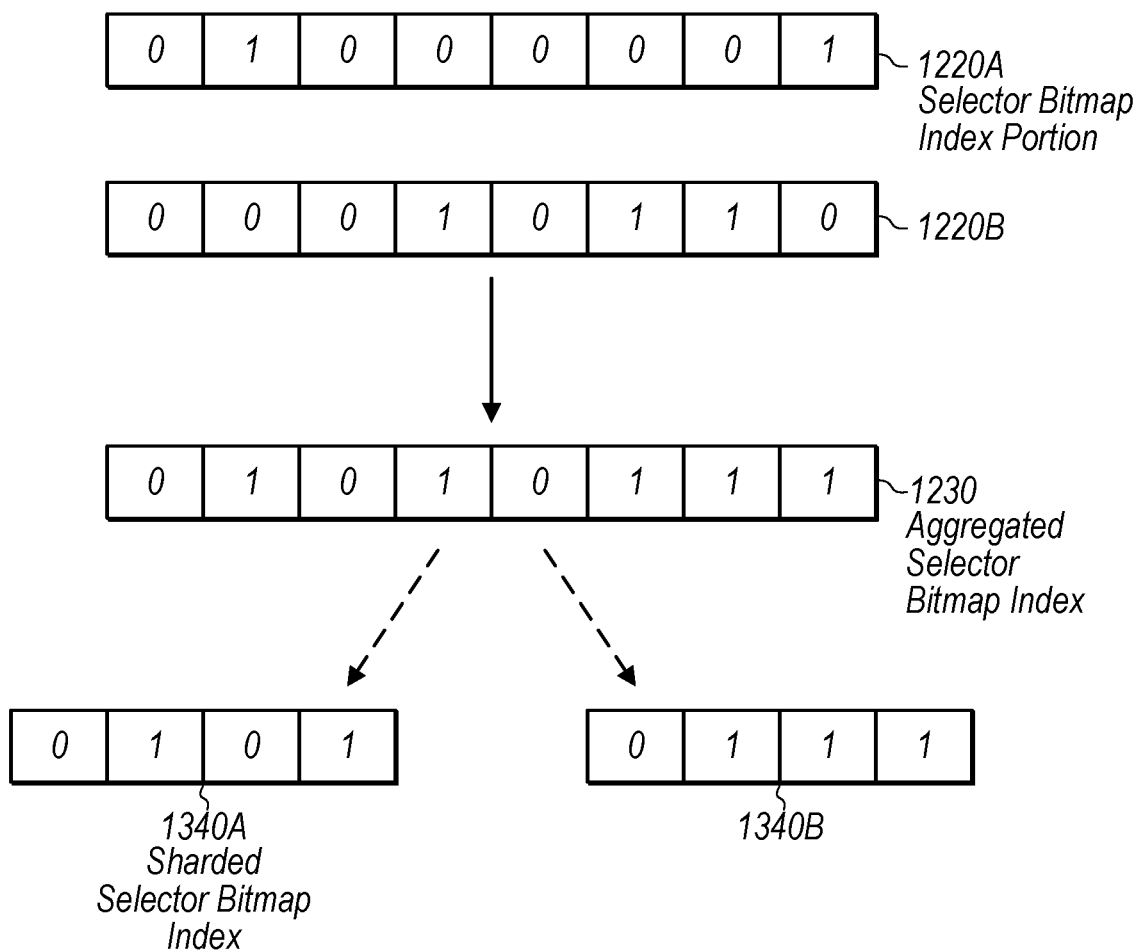

Turning now to FIG. 13B, a block diagram illustrating example elements of an example process for aggregating selector bitmap index portions 1220 into an aggregated selector bitmap index 1230. In the illustrated embodiment, there are selector bitmap index portions 1220A and 1220B, which may have been received by node 145A from nodes 145B and 145C. In various cases, node 145A (which serves as the leader node in this example) may also generate a selector bitmap index portion 1220 that it aggregates with selector bitmap index portions 1220A and 1220B.

As explained, after receiving selector bitmap index portions 1220, the leader node 145 may aggregate those portions 1220 into an aggregated selector bitmap index 1230. As shown, selector bitmap index portion 1220A includes eight bits, two of which have been set to a value of "1" (i.e., bit positions 1 and 7 when starting from 0) and selector bitmap index portion 1220B includes eight bits, three of which have been set to a value of "1" (i.e., bit positions 3, 5, and 6 when counting from 0). Consequently, aggregating selector bitmap index portions 1220A and 1220B results in an aggregated selector bitmap index 1230 that also includes eight bits, five of which have been set to a value of "1" (i.e., bit positions 1, 3, 5, 6, and 7). In some cases, a node 145 may create an aggregated selector bitmap index 1230 by performing a set of bitwise "OR" operations with the selector bitmap index portions 1220 (e.g., "ORing" selector bitmap index portion 1220A with selector bitmap index portion 1220B).

In various embodiments, an aggregated selector bitmap index 1230 is sharded into two or more sharded selector bitmap indexes 1340. The leader node 145 may then distribute those sharded selector bitmap indexes 1340 to the appropriate nodes 145. For example, node 145B may store a portion of the gender bitmap index (discussed below) that corresponds to users "0" through "3." Consequently, node 145B may receive sharded selector bitmap index 1340A as it corresponds to those users. Node 145C may store another portion of the gender bitmap index that corresponds to users "4" through "7" and thus may receive sharded selector bitmap index 1340B. By sharding an aggregated selector bitmap index 1230, less information may be sent across the network from the leader node 145 to the other nodes 145.

Figure 13C:
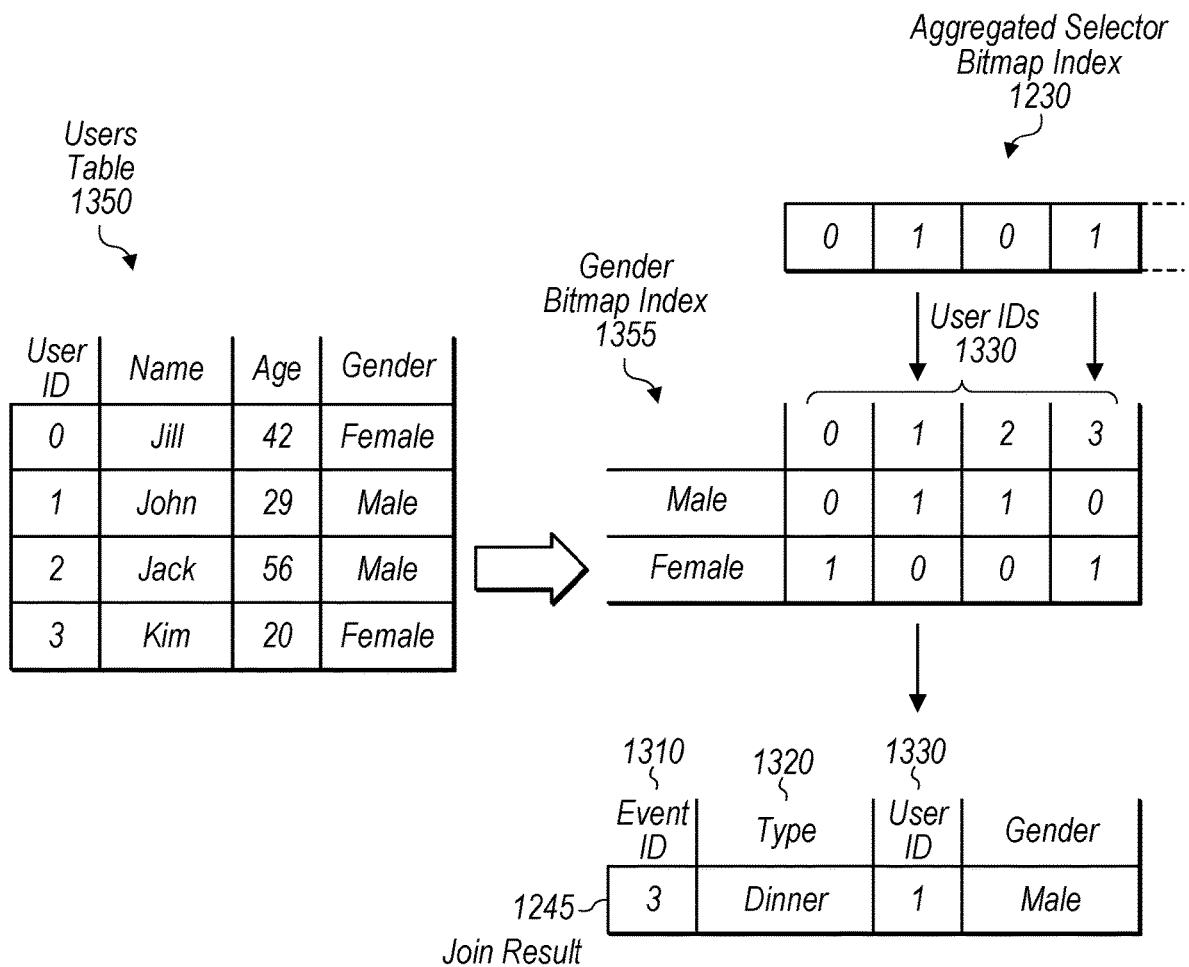

Turning now to FIG. 13C, a block diagram illustrating example elements of an example process for generating a join result 1245. In the illustrated embodiment, there is a users table 1350 and a gender bitmap index 1355. As shown, users table 1350 corresponds to a database table that can be found in a traditional SQL database. Gender bitmap index 1355 is a bitmap index derived from the gender column of users table 1350. In various embodiments, gender bitmap index 1355 is included in a single VDS 120 that may be sharded across multiple nodes 145 such that each node 145 includes a portion of that bitmap index.

After receiving an aggregated selector bitmap index 1230 (or a sharded selector bitmap index 1340), in various embodiments, a node 145 performs a second set of join operations to select data from the second bitmap index being joined to return as part of a join result 1245. A node 145 may initially identify, based on the received aggregated selector bitmap index 1230, entries/columns of the second bitmap index that are to be considered. As depicted, aggregated selector bitmap index 1230 includes bits set for user IDs 1330 "1" and "3" and therefore the corresponding entries of gender bitmap index 1355 are considered. The node 145, in various embodiments, identifies a portion of the entries that satisfy the set of criteria specified in the join query 1210. Accordingly, for the example, the node 145 may identify of those entries that are associated with the gender "male." As shown, user ID 1330 "1" has a gender "male" while user ID 1330 "3" does not. Thus, the node 145 may return data corresponding to user ID 1330 "1" to the leader node 145 for aggregation with a portion associated with the first bitmap index to derive a join result 1245.

In some cases, a node 145 (e.g., node 145B) may select, as part of the first set of join operations, a portion of the first bitmap index (e.g., event ID 1310 "3" and type 1320 "dinner") whose corresponding portion of the second bitmap index (e.g., user ID 1330 "1" and gender "male") is located at another node 145 (e.g., node 145C). As such, in various embodiments, nodes 145 may send portions of the first and second bitmap indexes to the leader node 145 for aggregation. Those portions may be stamped with an identifier (e.g., a user ID) that allows for the leader node 145 to aggregate them into a join result 1245. As an example, node 145B may return a portion of type bitmap index 1304 to the leader node 145 while node 145C may return a portion of gender bitmap index 1355. Those portions may be aggregated by the leader node 145 into the illustrated example join result 1245. The join result 1245 may then be sent to the initiator of the join query 1210 in a join response 1250.

While the example discussed throughout FIGS. 13A-C involved multiple nodes 145, in some cases, a join operation may be performed by a single node 145 without cooperating with other nodes 145, except to return a result. Consider an example in which node 145B receives a join query 1210 from node 145A. Node 145B may identify a portion of a first bitmap index (e.g., a bitmap index included in VDS 120A), generate a complete selector bitmap index, and identify a portion of a second, different bitmap index (e.g., a bitmap index included in VDS 120B) without interfacing with nodes 145A and 145C. Node 145B may then return a join result 1245 to node 145A, which can then return the join result 1245 to the initiator of the join query 1210.

Figure 14:
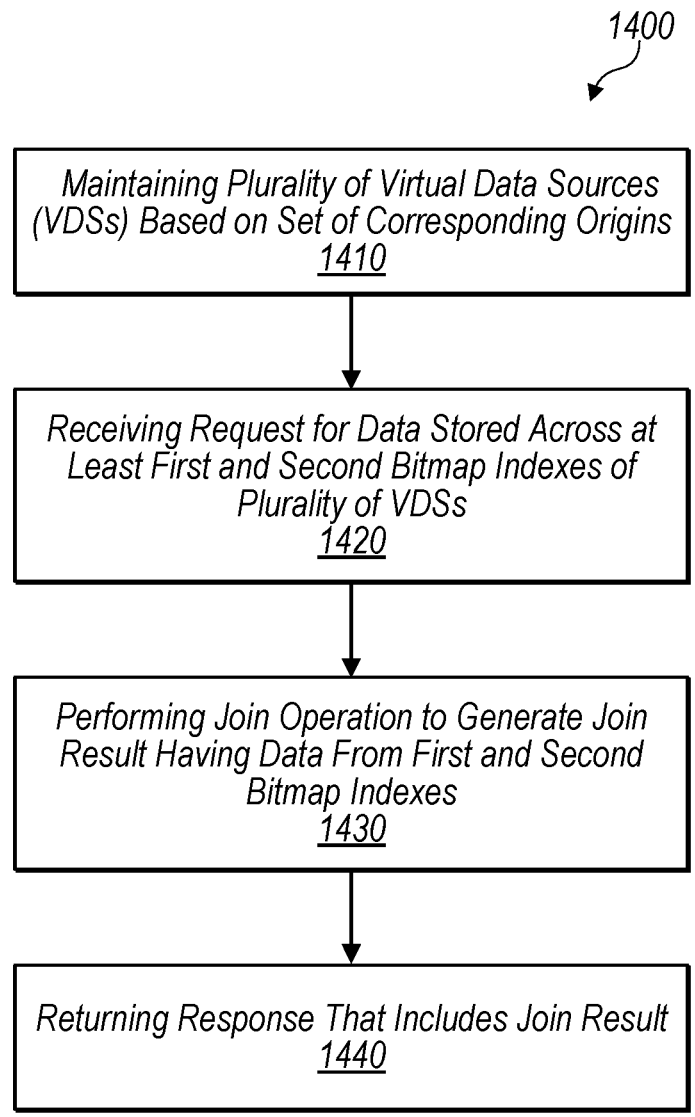
FIGS. 14 and 15 are flow diagrams illustrating example methods relating to performing a join operation with bitmap indexes, according to some embodiments.

Turning now to FIG. 14, a flow diagram of a method 1400 is shown. Method 1400 is one embodiment of a method performed by a compute cluster (e.g., a compute cluster 140) to carry out a join operation. In various cases, method 1400 may be performed by executing a set of program instructions stored on a non-transitory computer-readable medium. In some embodiments, method 1400 may include more or less steps than shown. For example, method 1400 may include a step in which a VDS is created.

Method 1400 begins in step 1410 with the distributed compute cluster maintaining a plurality of virtual data sources (e.g., VDSs 120) based on a set of corresponding origins (e.g., a data source 110). A given VDS of the plurality of VDSs may include a bitmap index that is representative of a portion (e.g., a database table) of data stored at the set of origins (e.g., stored at a SQL database).

In step 1420, the distributed compute cluster receives a request (e.g., a join request 1205) for data stored across at least first and second bitmap indexes (e.g., type bitmap index 1304 and gender bitmap index 1355) of the plurality of VDSs (e.g., VDSs 120A and 120B). In some cases, the first bitmap index may distributed across at least two compute nodes such that a first portion of the first bitmap index is maintained by a first compute node (e.g., node 145B) and a second portion of the first bitmap index is maintained by a second compute node (e.g., node 145C). The first bitmap index may be generated based on data stored in a first data table (e.g., events table 1302) at a first one of the set of origins and the second bitmap index may be generated based on a data stored in a second data table (e.g., users table 1350) at the same first origin. In some cases, the first bitmap index may be generated based on data stored in a data table at a first one of the set of origins and the second bitmap index may be generated based on data stored in a data table at a second one of the set of origins.

In step 1430, the distributed compute cluster performs a join operation to generate a join result (e.g., a join result 1245) having data from the first and second bitmap indexes. In some embodiments, performing the join operation includes using a linking bitmap index (e.g., user bitmap index 1306) that shares a common property with the first bitmap index (e.g., event IDs 1310) and a common property with the second bitmap index (e.g., user IDs 1330) to perform a first set of join operations with the first bitmap index to generate a selector bitmap index (e.g., an aggregated selector bitmap index 1230). In some cases, the linking bitmap index may store values (e.g., rows of bits) corresponding to user identifiers. Performing the first set of join operations may include identifying one or more entries of the first bitmap index based on a set of criteria that is specified by a join query (e.g., a join query 1210) included in the request for data and selecting one or more of the values using the identified one or more entries of the first bitmap index to generate the selector bitmap index.

In some embodiments, the first and second compute nodes each perform an intersect operation included in the first set of join operations using the linking bitmap index and the first and second portions of the first bitmap index, respectively. The first compute node may send, to an aggregating compute node (e.g., node 145A), a first portion of the selector bitmap index (e.g., selector bitmap index portion 1220A) generated at the first compute node and the second compute node may send, to the aggregating compute node, a second portion of the selector bitmap index (e.g., selector bitmap index portion 1220B) generated at the second compute node. The aggregating compute node may aggregate the first and second portions into the selector bitmap index and distribute the selector bitmap index to the first and second compute nodes.

Distributing the selector bitmap index to the first and second compute nodes may be such that a first portion of the selector bitmap index (e.g., sharded selector bitmap index 1340A) is provided to the first compute node and a second portion of the selector bitmap index (e.g., sharded selector bitmap index 1340B) is provided to the second compute node. Using the generated selector bitmap index, a second set of join operations may be performed with the second bitmap index to identify a portion of the second bitmap index. A portion of the first bitmap index and the identified portion of the second bitmap index may be aggregated to generate the join result of the join operation. In step 1440, the distributed compute cluster returns a response (e.g., join response 1250) that includes the join result.

Figure 15:

Turning now to FIG. 15, a flow diagram of a method 1500 is shown. Method 1500 is one embodiment of a method performed by a computer system (e.g., a node 145) to carry out a join operation. In various cases, method 1500 may be performed by executing a set of program instructions stored on a non-transitory computer-readable medium. In some embodiments, method 1500 may include more or less steps than shown. For example, method 1500 may include a step in which a VDS is created.

Method 1500 begins in step 1510 with the computer system maintaining a plurality of bitmap indexes that are representative of data stored at a set of origins (e.g., data sources 110). In step 1520, the computer system receives a request (e.g., a join request 1205) for data stored across at least first and second bitmap indexes (e.g., type bitmap index 1304 and gender bitmap index 1355) of the plurality of bitmap indexes. The request may include a join query (e.g., a join query 1210) specifying a set of criteria for selecting data to be returned in a join result (e.g., a join result 1245). The first bitmap index may be generated based on data stored in a data table (e.g., events table 1302) at a first one of the set of origins and the second bitmap index is generated based on data stored in a data table (e.g., users table 1350) at a second one of the set of origins.

In step 1530, the computer system performs a join operation to generate a join result having data from the first and second bitmap indexes. Performing the join operation may include identifying a portion (e.g., columns) of the first bitmap index that satisfies the set of criteria (e.g., associated with a type 1320 "dinner"). In various embodiments, a first set of intersect operations is performed using the portion of the first bitmap index and a linking bitmap index (e.g., user bitmap index 1305) to derive a selector bitmap index. The linking bitmap index may share a common property (e.g., event IDs 1310) with the first bitmap index and a common property (e.g., user IDs 1330) with the second bitmap index. In various embodiments, a second set of intersect operations is performed using the selector bitmap index and the second bitmap index to identify a portion of the second bitmap index. The portion of the first bitmap index and the portion of the second bitmap index may be aggregated to generate the join result of the join operation. In step 1540, the computer system returns a response (e.g., a join response 1250) that includes the join result.

Exemplary Computer System

Figure 16:
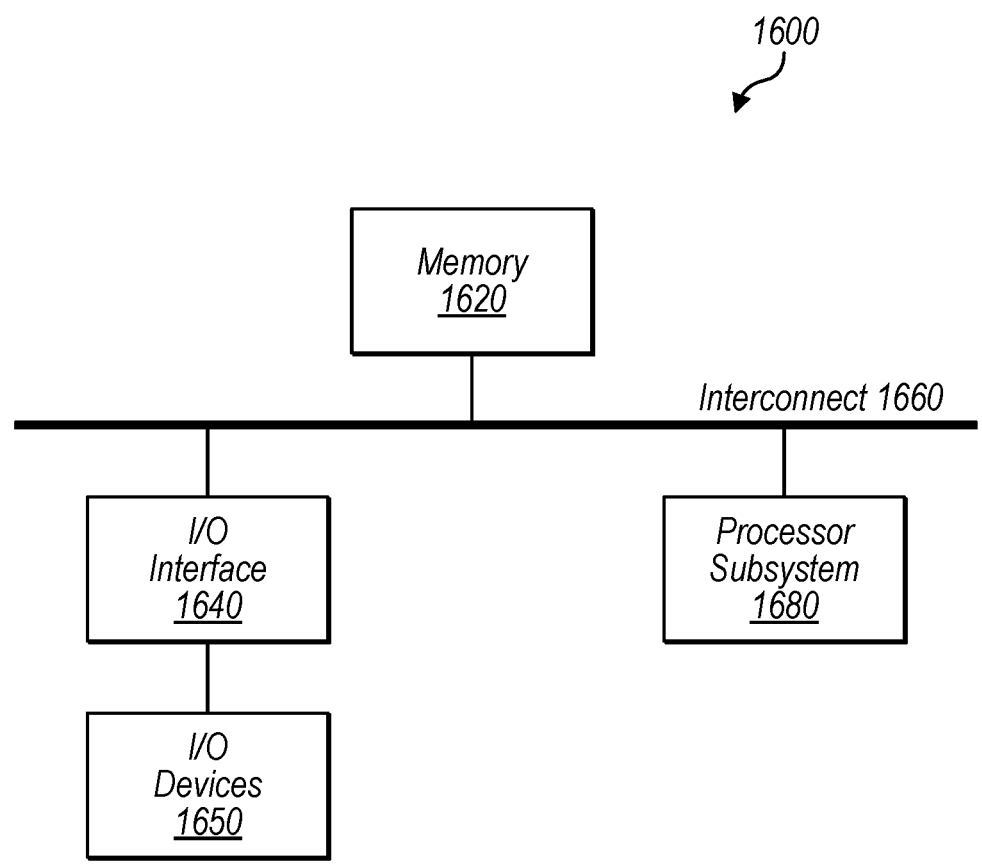
FIG. 16 is a block diagram illustrating an example computer system, according to some embodiments.

Turning now to FIG. 16, a block diagram of an exemplary computer system 1600, which may implement system 100, compute cluster 140, and/or a node 145, is depicted. Computer system 1600 includes a processor subsystem 1680 that is coupled to a system memory 1620 and I/O interfaces(s) 1640 via an interconnect 1660 (e.g., a system bus). I/O interface(s) 1640 is coupled to one or more I/O devices 1650. Computer system 1600 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1600 is shown in FIG. 16 for convenience, system 1600 may also be implemented as two or more computer systems operating together.

Processor subsystem 1680 may include one or more processors or processing units. In various embodiments of computer system 1600, multiple instances of processor subsystem 1680 may be coupled to interconnect 1660. In various embodiments, processor subsystem 1680 (or each processor unit within 1680) may contain a cache or other form of on-board memory.

System memory 1620 is usable store program instructions executable by processor subsystem 1680 to cause system 1600 perform various operations described herein. System memory 1620 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1600 is not limited to primary storage such as memory 1620. Rather, computer system 1600 may also include other forms of storage such as cache memory in processor subsystem 1680 and secondary storage on I/O Devices 1650 (e.g., a hard drive, storage array, etc.). In some embodiments, these other forms of storage may also store program instructions executable by processor subsystem 1680. In some embodiments, program instructions that when executed implement a data source 110, a VDS 120, and VDSM 130 may be included/stored within system memory 1620.

I/O interfaces 1640 may be any of various types of interfaces configured to couple to and communicate with other devices, according to various embodiments. In one embodiment, I/O interface 1640 is a bridge chip (e.g., Southbridge) from a front-side to one or more back-side buses. I/O interfaces 1640 may be coupled to one or more I/O devices 1650 via one or more corresponding buses or other interfaces. Examples of I/O devices 1650 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1600 is coupled to a network via a network interface device 1650 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

The present disclosure includes references to "an" "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
maintaining, by a distributed compute cluster having a set of compute nodes, a plurality of virtual data sources (VDSs) based on a set of corresponding origins, wherein a given VDS of the plurality of VDSs includes a bitmap index representative of a portion of data stored at the set of origins;
receiving, by the distributed compute cluster, a request for data stored across at least first and second bitmap indexes of the plurality of VDSs, wherein the first bitmap index is distributed across at least two of the set of compute nodes such that a first portion of the first bitmap index is maintained by a first compute node and a second portion of the first bitmap index is maintained by a second compute node;
performing, by the distributed compute cluster, a join operation to generate a join result having data from the first and second bitmap indexes, wherein the join operation is collectively performed by the first and second compute nodes that store respective portions of the first and second bitmap indexes; and returning, by the distributed compute cluster, a response that includes the join result.

2. The method of claim 1, wherein performing the join operation includes:
using a linking bitmap index that shares a common property with the first bitmap index and a common property with the second bitmap index, performing a first set of join operations with the first bitmap index to generate a selector bitmap index.

3. The method of claim 2, wherein the linking bitmap index stores values corresponding to identifiers, wherein performing the first set of join operations includes:
identifying one or more entries of the first bitmap index based on a set of criteria that is specified by a join query included in the request for data; and
selecting one or more of the values using the identified one or more entries of the first bitmap index to generate the selector bitmap index.

4. The method of claim 2, wherein the first and second compute nodes each perform an intersect operation included in the first set of join operations using the linking bitmap index and the first and second portions of the first bitmap index, respectively.

5. The method of claim 2, wherein performing the first set of join operations:
sending, by the first compute node to an aggregating compute node, a first portion of the selector bitmap index generated at the first compute node;
sending, by the second compute node to the aggregating compute node, a second portion of the selector bitmap index generated at the second compute node;
aggregating, by the aggregating compute node, the first and second portions into the selector bitmap index; and
distributing, by the aggregating compute node, the selector bitmap index to the first and second compute nodes.

6. The method of claim 2, wherein performing the first set of join operations:
distributing the selector bitmap index to the first and second compute nodes such that a first portion of the selector bitmap index is provided to the first compute node and a second portion of the selector bitmap index is provided to the second compute node.

7. The method of claim 2, wherein performing the join operation includes:
using the generated selector bitmap index, performing a second set of join operations with the second bitmap index to identify a portion of the second bitmap index; and
aggregating a portion of the first bitmap index and the identified portion of the second bitmap index to generate the join result of the join operation.

8. The method of claim 1, wherein the first bitmap index is generated based on data stored in a first data table at a first one of the set of origins and the second bitmap index is generated based on a data stored in a second data table at the same first origin.

9. The method of claim 1, wherein the first bitmap index is generated based on data stored in a data table at a first one of the set of origins and the second bitmap index is generated based on data stored in a data table at a second one of the set of origins.

10. A non-transitory computer-readable medium having program instructions stored thereon that are capable of causing a compute cluster to perform operations comprising:

maintaining a plurality of virtual data sources (VDSs) based on a set of corresponding origins, wherein a given VDS of the plurality of VDSs includes a bitmap index representative of a portion of data stored at the set of origins;

receiving a request for data stored across at least first and second bitmap indexes of the plurality of VDSs, wherein the first bitmap index is distributed across at least two compute nodes of the compute cluster such that a first portion of the first bitmap index is maintained by a first compute node and a second portion of the first bitmap index is maintained by a second compute node;

performing a join operation to generate a join result having data from the first and second bitmap indexes, wherein the join operation is collectively performed by the first and second compute nodes that store respective portions of the first and second bitmap indexes; and returning a response that includes the join result.

11. The medium of claim 10, wherein performing the join operation includes:
selecting a portion of the first bitmap index based on a set of criteria specified in a join query included in the request; and
selecting a portion of the second bitmap index based on the selected portion of the first bitmap index and the set of criteria, wherein the join result includes the selected portion of the first bitmap index and the selected portion of the second bitmap index.

12. The medium of claim 11, wherein selecting the portion of the second bitmap index includes:
identifying, based on the portion of the first bitmap index, a set of values included in a linking bitmap index;
generating a selector bitmap index based on the identified set of values; and
identifying, based on the selector bitmap index, a set of entries of the second bitmap index, wherein the portion of the second bitmap index is selected from the set of entries based on the set of criteria.

13. The medium of claim 10, wherein performing the join operation includes:
distributing a join query included in the request to the first and second compute nodes.

14. The medium of claim 10, wherein performing the join operation includes:
creating the join result by aggregating a plurality of join result portions from at least the first and second compute nodes, wherein a given join result portion is generated by a corresponding compute node based on a respective portion of the first and second bitmap indexes stored at the corresponding compute node.

15. A distributed compute cluster system, comprising:
at least one processor; and
memory having program instructions stored thereon that are executable by the at least one processor to perform operations comprising:
maintaining, by the distributed compute cluster system, a plurality of virtual data sources (VDSs) based on a set of corresponding origins, wherein a given VDS of the plurality of VDSs includes a bitmap index representative of a portion of data stored at the set of origins;
receiving, by the distributed compute cluster system, a request for data stored across at least first and second bitmap indexes of the plurality of VDSs, wherein the first bitmap index is distributed across at least two compute nodes such that a first portion of the first bitmap index is maintained by a first compute node and a second portion of the first bitmap index is maintained by a second compute node;

performing, by the distributed compute cluster system, a join operation to generate a join result having data from the first and second bitmap indexes, wherein the join operation is collectively performed by the first and second compute nodes that store respective portions of the first and second bitmap indexes; and returning, by the distributed compute cluster system, a response that includes the join result.

16. The distributed compute cluster system of claim 15, wherein performing the join operation includes:

selecting a portion of the first bitmap index based on a set of criteria specified in a join query included in the request; and selecting a portion of the second bitmap index based on the selected portion of the first bitmap index and the set of criteria, wherein the join result includes the selected portion of the first bitmap index and the selected portion of the second bitmap index.

17. The distributed compute cluster system of claim 16, wherein selecting the portion of the second bitmap index includes:

identifying, based on the portion of the first bitmap index, a set of values included in a linking bitmap index;

generating a selector bitmap index based on the identified set of values; and identifying, based on the selector bitmap index, a set of entries of the second bitmap index, wherein the portion of the second bitmap index is selected from the set of entries based on the set of criteria.

18. The distributed compute cluster system of claim 15, wherein performing the join operation includes:

distributing a join query included in the request to the first and second compute nodes.

19. The distributed compute cluster system of claim 15, wherein performing the join operation includes:

creating the join result by aggregating a plurality of join result portions from at least the first and second compute nodes, wherein a given join result portion is generated by a corresponding compute node based on a respective portion of the first and second bitmap indexes stored at the corresponding compute node.

* * * * *